(12) United States Patent
Schamp et al.

(10) Patent No.: US 12,277,533 B2
(45) Date of Patent: Apr. 15, 2025

(54) GENERATING COLLABORATIVE CONTENT ITEMS TO PROVIDE CUSTOMIZABLE GRAPHICAL REPRESENTATIONS IN ONLINE GRAPHICAL USER INTERFACES

(71) Applicant: Dropbox, Inc., San Francisco, CA (US)

(72) Inventors: Andrew Schamp, Oakland, CA (US); Raven Black, Naples, FL (US); Justin Hileman, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/605,736

(22) Filed: Mar. 14, 2024

(65) Prior Publication Data

US 2024/0220927 A1   Jul. 4, 2024

Related U.S. Application Data

(63) Continuation of application No. 18/146,859, filed on Dec. 27, 2022, now Pat. No. 11,935,007.

(51) Int. Cl.
  *G06Q 10/101* (2023.01)
  *G06F 3/0481* (2022.01)
  (Continued)

(52) U.S. Cl.
  CPC ......... *G06Q 10/101* (2013.01); *G06F 3/0481* (2013.01); *G06F 3/1454* (2013.01); *G06F 16/176* (2019.01); *G06F 40/166* (2020.01)

(58) Field of Classification Search
  CPC ... G06Q 10/101; G06F 3/0481; G06F 3/1454; G06F 16/176; G06F 40/166
  See application file for complete search history.

(56) References Cited

U.S. PATENT DOCUMENTS 5,251,292 A * 10/1993 Martel, Jr. ............ G06F 40/111
 715/236
7,310,784 B1 * 12/2007 Gottlieb .................... G06F 8/34
 717/102

(Continued)

FOREIGN PATENT DOCUMENTS

WO   2022153122 A1   7/2022

OTHER PUBLICATIONS

Non-Final Office Action from U.S. Appl. No. 18/146,859, mailed Aug. 1, 2023, 14 pages.

(Continued)

*Primary Examiner* — Keith D Bloomquist
(74) *Attorney, Agent, or Firm* — Keller Preece PLLC

(57) ABSTRACT

The present disclosure is directed toward systems, methods, and non-transitory computer readable media for generating, providing, and editing collaborative content items on client devices. For example, the disclosed systems provide a collaborative content item that includes a text display state and a render display state. A client device can provide for the collaborative content item to receive source text in the text display state. Then, based on the source text, the client device can provide for display of the collaborative content item in the render display state that generates a graphical representation for the collaborative content item based on rendering the source text. In some embodiments, the disclosed systems and methods allow two or more client devices to simultaneously modify the source text associated with the collaborative content item, and in turn, modify the graphical representation of the collaborative content item based on the modified source text.

20 Claims, 15 Drawing Sheets

(51) Int. Cl.
*G06F 3/14* (2006.01)
*G06F 16/176* (2019.01)
*G06F 40/166* (2020.01)

(56) References Cited

U.S. PATENT DOCUMENTS

| | | | | |
|---|---|---|---|---|
| 10,126,927 | B1* | 11/2018 | Fieldman | G06F 3/1454 |
| 10,345,989 | B2 | 7/2019 | Da Costa et al. | |
| 10,416,842 | B1* | 9/2019 | Bartlett | G06F 3/04842 |
| 2002/0016861 | A1* | 2/2002 | Simonoff | H04L 69/08 |
| | | | | 709/250 |
| 2002/0038206 | A1* | 3/2002 | Dori | G06F 40/58 |
| | | | | 703/22 |
| 2011/0252312 | A1 | 10/2011 | Lemonik et al. | |
| 2011/0252339 | A1 | 10/2011 | Lemonik et al. | |
| 2014/0032487 | A1* | 1/2014 | Rein | G06F 21/6245 |
| | | | | 707/622 |
| 2014/0281870 | A1* | 9/2014 | Vogel | G06F 40/18 |
| | | | | 715/220 |
| 2015/0195320 | A1* | 7/2015 | Avraham | G09B 5/14 |
| | | | | 709/219 |
| 2016/0266896 | A1* | 9/2016 | Fan | G06F 11/36 |
| 2016/0357377 | A1 | 12/2016 | Thimbleby | |
| 2017/0192656 | A1* | 7/2017 | Pedrick | G06F 3/04847 |
| 2017/0286070 | A1* | 10/2017 | Holzleitner | G06F 8/65 |
| 2017/0289210 | A1* | 10/2017 | Pai | H04L 65/4015 |
| 2017/0308610 | A1* | 10/2017 | Mullins | G06F 40/197 |
| 2018/0052587 | A1* | 2/2018 | LaPier | G06F 3/0482 |
| 2018/0189255 | A1* | 7/2018 | Kofman | G06F 3/0482 |
| 2018/0335935 | A1* | 11/2018 | Larson | G06F 3/04842 |
| 2019/0129973 | A1 | 5/2019 | Truong | G06F 16/93 |
| 2019/0138267 | A1* | 5/2019 | Mailey | G06F 3/04817 |
| 2019/0361580 | A1* | 11/2019 | Dowling | G06F 3/0484 |
| 2019/0378429 | A1* | 12/2019 | Panuganty | G06F 40/10 |
| 2021/0081080 | A1* | 3/2021 | Uy | G06F 3/04847 |
| 2021/0295738 | A1* | 9/2021 | Kapoor | G06V 30/416 |
| 2022/0221966 | A1 | 7/2022 | Zionpour et al. | |
| 2024/0056553 | A1* | 2/2024 | Brudy | G06F 3/1454 |

OTHER PUBLICATIONS

Notice of allowance from U.S. Appl. No. 18/146,859, mailed Dec. 27, 2023, 6 pages.

* cited by examiner

GENERATING COLLABORATIVE CONTENT ITEMS TO PROVIDE CUSTOMIZABLE GRAPHICAL REPRESENTATIONS IN ONLINE GRAPHICAL USER INTERFACES

CROSS REFERENCE TO RELATED APPLICATION

This application is a continuation of U.S. application Ser. No. 18/146,859 filed on Dec. 27, 2022. The aforementioned application is hereby incorporated by reference in its entirety.

BACKGROUND

Advancements in computing devices and networking technology have given rise to a variety of innovations in collaborative digital content storage and sharing. For example, existing online sharing systems can provide devices all over the world access to digital content stored in the cloud. Existing online sharing systems can also synchronize changes to shared digital content across different types of devices operating on different platforms. Indeed, existing online sharing systems can provide access to digital content within which users can collaborate from across diverse geographic locations using a variety of computing devices. Despite these advances, however, existing online sharing systems continue to suffer from a variety of disadvantages, particularly in terms of flexibility, accuracy, and efficiency.

As suggested, existing online sharing systems have a number of disadvantages. Many existing systems are limited to displaying content items in a static manner within an online document that leads to system rigidity and inflexibility. For example, there often is a need to provide graphical elements such as charts, flow diagrams, equations, and other similar graphical items within an online document for user consumption during collaboration. As often is the case, however, as projects progress there is a need to update the graphical items. However, because existing systems provide static versions of graphical items, a user is required to delete an old version of a graphical item from the online document and add an updated version of the graphical item. This process often involves a user accessing a second application, creating the updated graphical item, exporting, or copying the updated graphical item, and then adding it to the online document within the online sharing system. Accordingly, there are a number of disadvantages due to the static nature of graphical elements in existing online sharing interfaces.

For instance, existing online sharing systems that rely on static graphical elements suffer from user navigation inefficiencies within graphical user interfaces. Indeed, existing systems often require a user to take numerous navigation steps within different graphical user interfaces across multiple applications to create or modify a graphical element shared within an online document. For example, in existing systems, if a user needed to update a flow chart shared within an online sharing interface, the user would need to navigate away from the online sharing interface to access a second application within which to create the updated flow chart. The user would then provide additional interaction steps to export or save the updated flow chart, access the saved updated flow chart to upload into the online sharing interface, and then format the updated flow chart within the online sharing interface. Indeed, these navigation and interaction steps would need to be performed each time a graphical element needed to be updated.

Due in part to the graphical user interface inefficiencies exhibited by existing online sharing systems, existing systems are inflexible and rigid. While many users may have access to the online sharing interface within which a graphical element is incorporated, often only one user or a subset of users may have access to the actual editable file from which the static graphical element was created. Accordingly, existing systems are inflexible and rigid because these systems do not allow users to modify shared content even when the users seemingly have access to the content. This rigidity leads to an inefficient graphical user interface experience that lacks the ability to provide all users with equal access capabilities to shared content.

As suggested, due at least in part to their inflexibility, some existing online sharing systems lead to inaccuracies. For example, there is often no source of truth for the static content items within existing systems, which also leads to inaccuracies within the online sharing interface. To demonstrate, a team may include a particular graphical item within multiple online sharing interfaces. But because the graphical item is static, every time the graphical item is updated, a user may fail to update the graphical item across all online sharing interfaces. Accordingly, a first interface can display a first version, while a second interface can display a second version. Because existing systems force manual updates of each instance of the graphical element, existing systems often cause versioning errors that result in inaccurate data and information. Consequently, elements within the communication interface often display outdated and inaccurate representations of content.

Moreover, many existing systems create additional computing resource inefficiencies. For example, due to having to utilize static graphical elements, existing systems often generate many duplicates of the graphical elements when using various applications to modify, save, and upload the content. Generating duplicates of content items (rather than manipulating an original version of a content item) inefficiently utilizes digital storage resources. Moreover, processing the excessive numbers of user interactions involved in existing systems (e.g., in accessing and/or organizing content items) consumes computing resources such as processing power and memory that could otherwise be preserved with more efficient systems and/or user interfaces.

Thus, there are several disadvantages with regard to existing online sharing systems.

SUMMARY

One or more embodiments provide benefits and/or solve one or more of the foregoing or other problems in the art with systems, methods, and non-transitory computer readable storage media that utilize an online document to share a collaborative content item that includes a text display state and a render display state. A client device can activate the text display state for the collaborative content item and input source text into the text display state. The client device can also activate the render display state within which the source text is rendered to generate a graphical representation of the collaborative content item. The systems and methods described herein can provide the collaborative content within the shared online document to multiple client devices. Accordingly, the systems and methods cause the client devices to display the graphical representation of the collaborative content item while in the render display state, but also allow each of the client devices to activate the text display state to provide edits, updates, and/or modifications to the source text resulting in a collaboratively generating an updated graphical representation of the collaborative content item across all client devices having access to the online document. Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
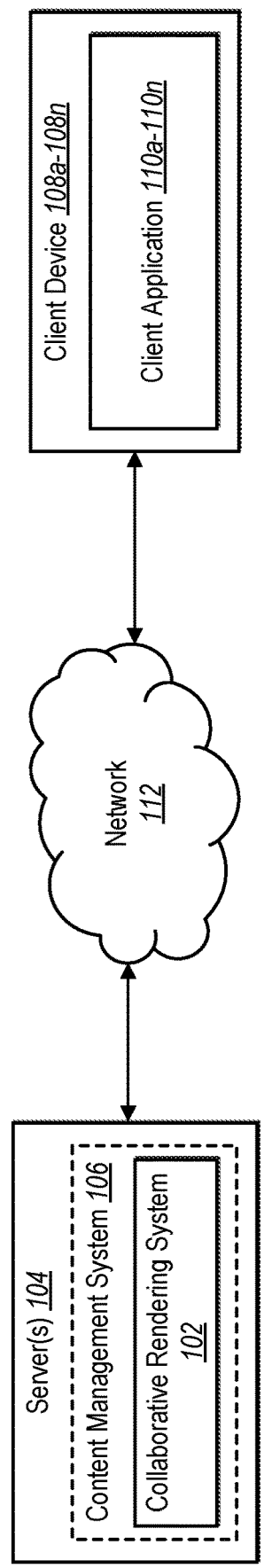
FIG. 1 illustrates a schematic diagram of an example environment of a collaborative rendering system in accordance with one or more embodiments.

This disclosure describes one or more embodiments of a collaborative rendering system that provides an online document within which the collaborative rendering system can generate, provide, and edit a collaborative content item that includes a text display state and a render display state. In particular, the collaborative rendering system facilitates the creation of a collaborative content item for display at a client device, where the collaborative content item, when in the render display state, generates a graphical representation (e.g., flowchart, sequence diagram, equation) based on source text input by a user when the collaborative content item is in the text display state.

For example, upon a first client device accessing an online document (e.g., via a web browser) that includes a collaborative content item, the collaborative rendering system causes the first client device to render the collaborative content item in the render display state to generate a graphical representation of the collaborative content item. Based on receiving a user interaction with respect to the collaborative content item, the collaborative content item can switch from the render display state to the text display state. While in the text display state, a user associated with the first client device can add to or edit source text to effectively and efficiently update the graphical representation of the collaborative content item. In addition, the collaborative rendering system can receive the edits to the source text and provide the edits to a second client device that has access to the online document. Based on the updated source text, the second client device can provide for display the updated graphical representation of the collaborative content item. In this way, the collaborative rendering system provides a shared graphical user interface of an online document within which the collaborative content item can generate a graphical representation that is easily editable and updatable by all client devices that have access to the online document.

In one or more embodiments, the collaborative rendering system dynamically renders graphical content for collaborative use within an online document hosted by a content management system. More particularly, the collaborative rendering system can detect a user interaction with a collaborative content item on a first client device and provide an editable text zone within a text display state to allow the first client device to edit the source text. Simultaneously, the collaborative rendering system can detect a user interaction with the collaborative content item on a second client device and provide an editable text zone within a text display state to allow the second client device to edit the source text. Accordingly, the collaborative rendering system provides a graphical user interface on multiple client devices for live collaboration on the collaborative content item to collaboratively generate graphical content based on a graphical representation of the collaborative content item provided in the render display state.

Because the collaborative rendering system allows for collaboration on graphical content by using collaborative content items, the collaborative rendering system can utilize render display logic to validate source text prior to updating a graphical representation of a collaborative content item. For example, the collaborative rendering system can receive an edit to the source text for a collaborative content item. The collaborative rendering system can determine that the edit to the source text includes a syntax error that would make the source text unrenderable. Based on identifying the error, the collaborative rendering system can persist the prior graphical representation of the collaborative content item based on the prior source text until the error is corrected. By persisting the last renderable version of the collaborative content item, the collaborative rendering system provides a unique user interface that allows for collaborative collaboration on graphical content while also providing an efficient user experience.

In one or more embodiments, the collaborative rendering system can display different historical versions of the graphical content. For instance, as mentioned previously, the collaborative rendering system can display the most recent valid version of the graphical content. Additionally, the collaborative rendering system can provide selectable options that are associated with prior versions of the collaborative content item, and upon receiving a selection of an option, provide a display a historical version of the collaborative content item. Indeed, the unique nature of the collaborative content item allows the collaborative rendering system to provide collaborative graphical content that includes an accessible versioning history.

In addition to providing versioning features, the collaborative rendering system can utilize a collaborative content item to provide additional collaborative features. For example, and as mentioned above, the collaborative rendering system can provide a collaborative content item within an online document (e.g., an online space accessible and/or shared between multiple client devices associated with multiple users). In some embodiments, the collaborative rendering system provides a commenting option that allows users associated with the client devices to comment on aspects of the collaborative content item. For instance, the collaborative rendering system can allow a user to input and associate a comment with the graphical representation of the collaborative content item while in the render display state. Moreover, the collaborative rendering system can allow a user to input and associate a comment with a portion of source text that is displayed when the collaborative content item is in the text display state. In a similar fashion, the collaborative rendering system can provide simultaneous access to multiple client devices, and accordingly, the collaborative rendering system can provide each client device indications of other user actions with respect to the collaborative content item in real-time or near real-time. The collaborative rendering system can provide additional features and functionality as described in detail with respect to the figures below.

As suggested above, the collaborative rendering system can provide several improvements or advantages over existing systems. For example, embodiments of the collaborative rendering system can provide improved flexibility over prior systems. To illustrate, many existing systems display static versions of graphical content items that were generated separately in other applications. As opposed to existing systems that rigidly display a static version of graphical items, the collaborative rendering system can provide a dynamic, editable version of graphical content within a sharable online document. Indeed, by providing a dynamic, editable version of the graphical content, the collaborative rendering system alleviates the need to display additional versions (or replacement versions) whenever the graphical content needs to be updated.

This flexibility also increases accuracy over prior systems. Because existing systems do not provide real-time updates reflecting user changes to the graphical content, the graphical content that is displayed within existing systems is often inaccurate. However, the collaborative rendering system provides a collaborative content item that corresponds to the real-time valid version of the graphical content, rather than providing often inaccurate and outdated static versions. Indeed, the collaborative rendering system can update the graphical content dynamically according to user edits, rather than perpetually maintaining the same, often inaccurate, static graphic content of existing systems. In addition, the collaborative content item becomes a single source of truth since there is no for a user to go to a different application to update graphical content.

Similarly, due at least in part to improving flexibility and accuracy over prior systems, the collaborative rendering system can also improve efficiency over such systems. As an example, the collaborative rendering system can mitigate or reduce the uncertainty caused by displaying duplicate versions of graphical content items while saving storage resources that prior systems waste by maintaining duplicative content. As another example, the collaborative rendering system can provide more efficient user interfaces (e.g., a collaborative text display interface) that reduce the number of user interactions required to access desired data or functionality. Specifically, the collaborative rendering system provides a collaborative content item that includes a text display state and a render display state that allows a user to edit source text within the text display state to generate updated graphical representations when in the render display state. Compared to existing systems that require the user to create the graphical content in another application and then copy and paste an image of the graphical content into the content management system, the collaborative rendering system provides an efficient integration without the need to access outside applications. Consequently, the collaborative rendering system further saves computing resources that prior systems expend processing their larger numbers of user interactions for accessing or organizing graphical content items.

As illustrated by the foregoing discussion, the present disclosure utilizes a variety of terms to describe features and benefits of the collaborative rendering system. Additional detail is hereafter provided regarding the meaning of these terms as used in this disclosure. As used herein, the term "collaborative content item" (or "collaborative graphical content") refers to a digital content type that includes comprises a render display state and a text display state. The render display state comprises a graphical representation that is rendered from source text. The text display state comprises a text input zone that allows a client device to create and edit the source text. In some embodiments, the collaborative rendering system can provide the text display state and the render display state at the same time.

Relatedly, the collaborative rendering system can create collaborative content items within an online document. As used herein, the term "online document" is used in reference to systems and/or content that multiple devices can access, edit, view, store, share, sync, and collaborate on simultaneously. For example, an online document application can provide an online document within a collaborative interface within which multiple client devices can share content in real time. To illustrate, DROPBOX PAPER is an example of an application which allows the creation and editing of online documents.

As mentioned, to generate a collaborative content item the collaborative rendering system can cause a client device to render source text to generate a graphical representation of the collaborative content item. As used herein, the term "render" refers to the process of generating graphical content from source text by means of a computer application. For example, a computer application can render a graphical representation of a sequence diagram or mathematical equation from source text. To illustrate, the Mermaid Live Editor can use a textual scripting language to generate a flowcharts to provide a graphical representation corresponding to source text. Other textual scripting languages can be used within a collaborative content item, such as equation language (e.g., Formula, MPL, etc.) to create graphical representations of mathematical formulas, sequence diagram languages (e.g., PlantUML, Unified Modeling Language, etc.). Notwithstanding a particular textual scripting language, the collaborative content item disclosed herein allows for the input of source text that is then rendered to generate a graphical representation.

As mentioned, in some embodiments, the collaborative rendering system comprises a render display state. As used herein, a "render display state" can refer to a display state that provides a graphical representation of a collaborative content item. For example, the collaborative rendering system can provide a collaborative content item in a render display state that generates a graphical representation of a sequence diagram based on source text corresponding to the sequence diagram.

Relatedly, in some embodiments, the collaborative rendering system comprises a text display state. As used herein, the term "text display state" refers to a display state that provides a text input zone that accepts source text to allow a client device to create and edit the source corresponding to the collaborative content item. For example, the collaborative rendering system can provide a text input zone when in the text display state to accept textual scripting language used to generate a sequence diagram. In some embodiments, when the collaborative rendering system provides a collaborative content item in the text display state both a graphical representation of the content item is provided along with the text input zone. In this way, the collaborative rendering system can provide real-time or near real-time updates of the graphical representation as a user edits the source text.

As mentioned, the collaborative rendering system can generate a graphical representation of a collaborative content item. As used herein, the term "graphical representation" (or "graphical content") refers to graphical content that can be generated and displayed by interpreting source text. A graphical representation can include a graphical item such as a block diagram, a Gantt diagram, a class diagram, a Git diagram, a sequence diagram, a pie chart, an Entity Relationship diagram, an equation, decision tree, or a User Journey diagram. A graphical representation can have a particular format and may be editable by modifying the associated source text. In some cases, a graphical representation includes graphical content items that can be rendered in different formats based on user preferences, client device attributes, and other factors as described herein.

Additional detail regarding the collaborative rendering system will now be provided with reference to the figures. FIG. 1 illustrates a schematic diagram of an example system environment for implementing a collaborative rendering system 102 in accordance with one or more implementations. An overview of the collaborative rendering system 102 is described in relation to FIG. 1. Thereafter, a more detailed description of the components and processes of the collaborative rendering system 102 is provided in relation to the subsequent figures.

As shown, the environment includes server(s) 104, client devices 108a-108n, and a network 112. Each of the components of the environment can communicate via the network 112, and the network 112 may be any suitable network over which computing devices can communicate. Example networks are discussed in more detail below in relation to FIGS. 12-13.

As mentioned above, the example environment includes a client devices 108a-108n. The client devices 108a-108n can be one of a variety of computing devices, including a smartphone, a tablet, a smart television, a desktop computer, a laptop computer, a virtual reality device, an augmented reality device, or another computing device as described in relation to FIGS. 12-13. The client devices 108a-108n can communicate with the server(s) 104 via the network 112. For example, the client devices 108a-108n can receive user input from respective users interacting with the client devices 108a-108n (e.g., via the collaborative rendering client application 110a-110n) to, for instance, access, generate, modify, or share an online document that includes a collaborative content item. In addition, the collaborative rendering system 102 on the server(s) 104 can receive information relating to various interactions with content items and/or user interface elements based on the input received by the client devices 108a-108n (e.g., to access content items, generate subgroupings of content items, or perform some other action).

As shown, the client devices 108a-108n can include client applications 110a-110n. In particular, the client applications 110a-110n may be a web browser, web applications, native applications installed on the client devices 108a-108n (e.g., a mobile application, a desktop application, etc.), or cloud-based applications where all or part of the functionality is performed by the server(s) 104. Based on instructions from the client applications 110a-110n, the client devices 108a-108n can present or display information, including a user interface such as an online document that includes depictions of collaborative content items, along with viewing, editing, and collaboration options.

As illustrated in FIG. 1, the example environment also includes the server(s) 104. The server(s) 104 may generate, track, store, process, receive, interact with, and transmit electronic data, such as digital content items, collaborative content items, interactions with digital content items, and/or interactions between user accounts or client devices. For example, the server(s) 104 may receive data from the client devices 108a-108n in the form of a request to generate a content item or to generate a subgrouping for a dynamic facet. In addition, the server(s) 104 can transmit data to the client devices 108a-108n in the form of a content item, a comment, content attributes, a collaborative content item, or some other information. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the collaborative rendering system 102 as part of a content management system 106. The content management system 106 can communicate with the client devices 108a-108n to perform various functions associated with the collaborative rendering client applications 110a-110n such as managing user accounts, managing content collections, managing content items, and facilitating user interaction with the content collections and/or content items. Indeed, the content management system 106 can include a network-based smart cloud storage system to manage, store, and maintain content items and related data across numerous user accounts. In some embodiments, the collaborative rendering system 102 and/or the content management system 106 utilize a database to store and access information such as digital content items, content attributes, dynamic facets, and other information.

Although FIG. 1 depicts the collaborative rendering system 102 located on the server(s) 104, in some implementations, the collaborative rendering system 102 may be implemented by (e.g., located entirely or in part) on one or more other components of the environment. For example, the collaborative rendering system 102 may be implemented by the devices 108a-108n, and/or a third-party device. For example, the client devices 108a-108n can download all or part of the collaborative rendering system 102 for implementation independent of, or together with, the server(s) 104.

In some implementations, though not illustrated in FIG. 1, the environment may have a different arrangement of components and/or may have a different number or set of components altogether. For example, the client devices 108a-108n may communicate directly with the collaborative rendering system 102, bypassing the network 112. As another example, the environment may include multiple client devices, each associated with a different user account for managing digital content items. In addition, the environment can include a database located external to the server(s) 104 (e.g., in communication via the network 112) or located on the server(s) 104 and/or on the client devices 108a-108n.

Figure 2:
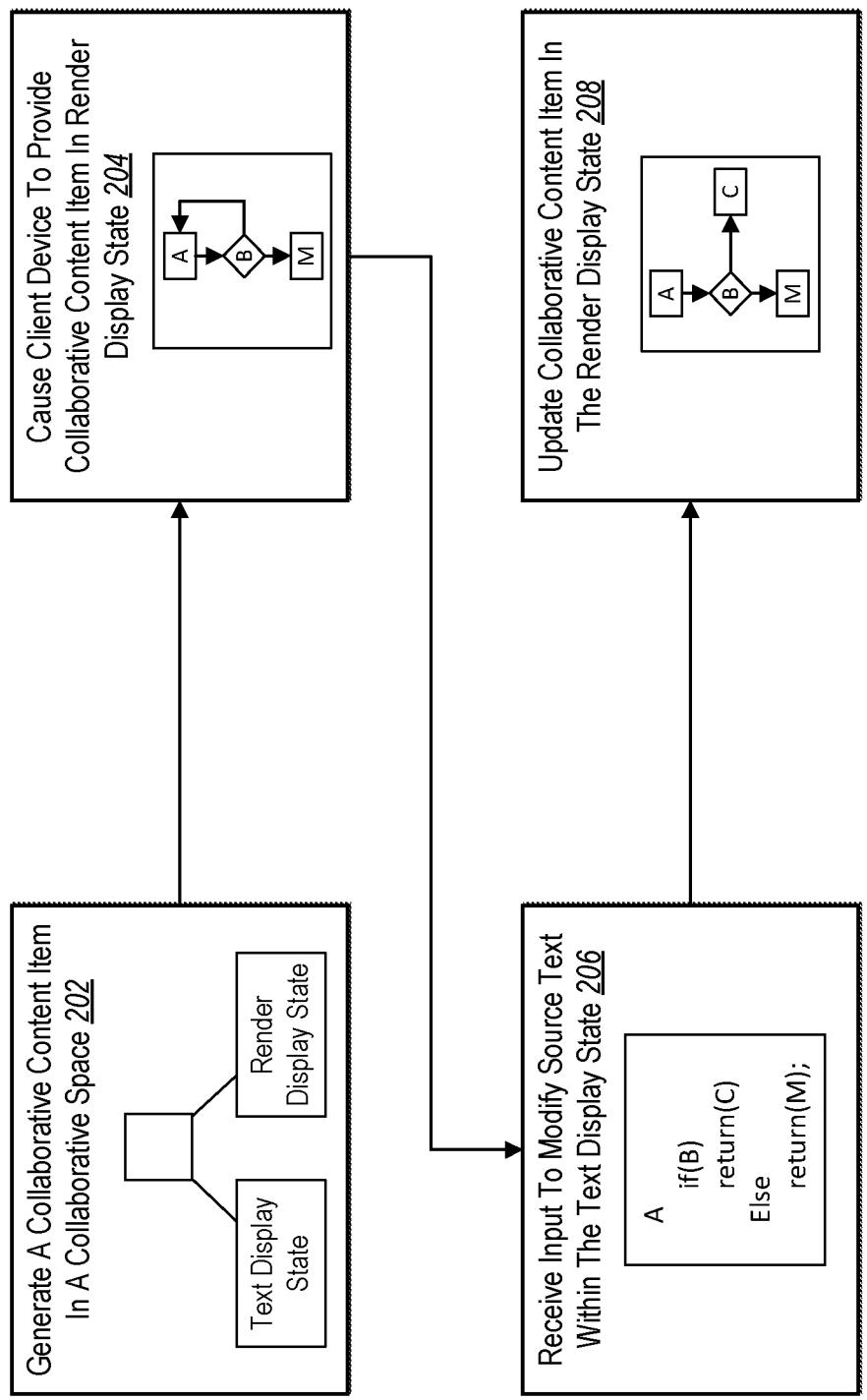
FIG. 2 illustrates an example overview of generating and providing a collaborative content item in accordance with one or more embodiments.

As mentioned above, the collaborative rendering system 102 can generate collaborative graphical content by using a collaborative content item. In particular, the collaborative rendering system 102 can generate a collaborative content item comprising a render display state and a text display state. FIG. 2 illustrates an overview of generating and editing collaborative content items within an online document in accordance with one or more embodiments. Additional detail regarding the various acts of FIG. 2 is provided thereafter with reference to subsequent figures.

As illustrated in FIG. 2, the collaborative rendering system 102 performs an act 202 to generate a collaborative content item in a collaborative space, such as an online document. More specifically, the collaborative rendering system 102 generates a collaborative content item comprising a render display state and a text display state. The render display state comprises a graphical representation of the collaborative content item that is based on rendering source text. The text display state comprises a text input zone that accepts the source text. In some embodiments, the text display state also comprises a graphic display zone to display the graphical representation of the collaborative content item that is rendered from the source text.

In some examples, the collaborative content item is integrated directly into the online document. In addition, while not shown, the online document can include content in addition to the collaborative content item, such as digital images, video, audio, text, links and/or other content items. The online document can also multiple collaborative content items accessible. As explained above, the online document is accessible by user accounts of the collaborative rendering system 102. In some embodiments, the online document identifies (i.e., includes a link as a pointer) content items that includes content stored in one or more network locations associated with the content management system 106 (e.g., associated with a user account).

Based on generating a collaborative content item, the collaborative rendering system 102 further causes a client device to render the graphical representation of the collaborative content item in a render display state. To elaborate, the collaborative rendering system 102 performs the act 204 to provide and cause the client device to render a graphical rendering (e.g., block diagram, Gantt diagram, class diagram, Git diagram, sequence diagram, pie chart, Entity Relationship diagram, equation, or User Journey diagram) of the collaborative content item in the online document. As an example, the collaborative rendering system 102 can provide a collaborative content item that comprises source text associated with a flowchart (e.g., flowchart source text) to a client device. Additionally, the collaborative rendering system 102 can cause the client device to render a graphical flowchart (within the collaborative content item render display state) that corresponds to the source text. To illustrate, the collaborative rendering system 102 performs the act 204 to cause the client device to render the appropriate graphical representation of a sequence diagram from the sequence diagram source text within a collaborative content item in DROPBOX PAPER.

Additionally, the collaborative rendering system 102 can cause the client device to modify the collaborative content item within the online document based on user input. In particular, the collaborative rendering system 102 can perform an act 206 to receive an input to change the collaborative content item from the render display state to the text display state. This input can be a user selection of the collaborative content item (e.g., mouse click, keyboard shortcut), a user interaction (e.g., menu item selection, mouse hover, mouse drag, vocal instruction), or a system input (e.g., system command, application instruction). Within the text display state, the collaborative content item can receive source text to modify the collaborative content item. Indeed, the collaborative rendering system 102 can perform act 206 to receive an input to change the collaborative content item to the text display state on multiple client devices and allow multiple client devices to modify the collaborative content item concurrently in real-time. As shown, the source text comprises source text that is used to generate the graphical representation of the collaborative content item.

As further illustrated in FIG. 2, in some embodiments, the collaborative rendering system 102 performs an act 208 to generate a collaborative content item in the online document. More particularly, the collaborative rendering system 102 generates an updated collaborative content item based on the input received in act 206 that updates the source text. For example, the collaborative rendering system 102 generates a collaborative content item by rendering a graphical representation of the updated source text that a user input via the text zone within the text display state. In some cases, the collaborative rendering system 102 determines that the source text is unrenderable (e.g., contains syntax errors) and causes the client device to maintain the display of the last valid version of the graphical representation (e.g., persists in displaying the previous graphical representation immediately preceding the introduction of a syntax error). In some embodiments, the collaborative rendering system 102 also provides an option to display alternate (e.g., historical) versions of the graphical representation in the online document, as will be described further below.

Figure 3:
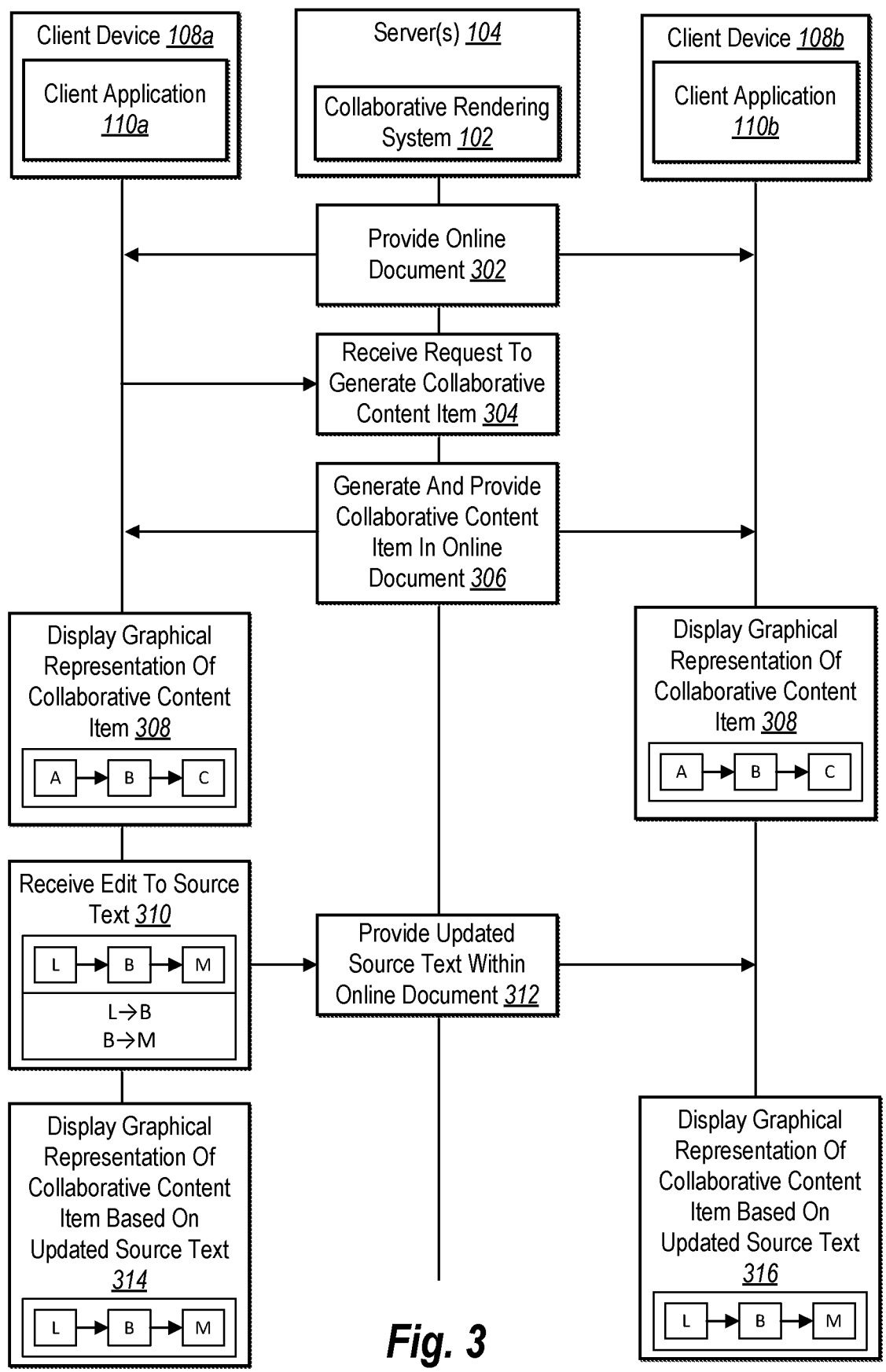
FIG. 3 illustrates an example of multiple client devices accessing a collaborative content item in accordance with one or more embodiments.

As mentioned above, in certain described embodiments, the collaborative rendering system 102 generates and provides a graphical user interfaces for display on a client device (e.g., the client devices 108a and 108b) that are associated with a text display state and a render display state of a collaborative content item provided within client applications 110a and 110b. In particular, the collaborative rendering system 102 provides a collaborative rendering interface for presenting and editing collaborative content items within an online document. As illustrated in FIG. 3, the collaborative rendering system 102 hosted on server(s) 104 perform act 302 of providing an online document to the client device 108a and client device 108b. For example, the collaborative rendering system 102 can provide an online document, such as an online document provided by the DROPBOX PAPER application. As explained above, the collaborative rendering system provides the ability for both the client device 108*a* and client device 108*b* to concurrently access the online document (including accessing the content within the online document).

As further shown in FIG. 3, the collaborative rendering system 102 can perform act 304 of receiving a request to generate a collaborative content item. In response to the request, the collaborative rendering system 102 can perform act 306 of generating and providing the collaborative content item to both the client device 108*a* and client device 108*b*. In particular, the collaborative rendering system 102 can insert the collaborative content item within a specified location in the online document as specified by client device 108*a*.

Upon providing the collaborative content item to client device 108*a* and client device 108*b*, the collaborative content system 102 can cause each of client devices 108*a* and 108*b* to perform act 308 of displaying a graphical representation of the collaborative content item. In particular, based on source text that client device 108*a* provides, or based on default source text the collaborative rendering system 102 provides, each of client device 108*a* and 108*b* can render the source text to generate a flowchart as indicated in act 308. For example, as shown, the collaborative content item is displayed in the render display state and provides a graphical representation of a flowchart rendered from the source text.

As shown in FIG. 3 and act 308, in some embodiments, the collaborative rendering system 102 can provide an identical graphical representation of the collaborative content item on both client devices 108*a* and 108*b*. In some embodiments, the collaborative rendering client application 110*a* can provide a different graphical representation on different client devices based on several factors. For example, client device 108*a* may have a different screen size or resolution than client device 108*b*, and therefore, provides the graphical representation in a different format. In addition to or alternatively, the client device 108*a* displays the same underlying flowchart logic (e.g., source text) as shown by client device 108*b* but uses different line weights, colors, orientation, fonts, and/or sizes based on user preferences specific to client device 108*a*. Or, as mentioned previously, client device 108*a* can display a flowchart that reflects a previous version of the graphical representation (e.g., based on a user selection), while client device 108*b* can provide the latest version of the flowchart.

As further illustrated in FIG. 3, the client device 108*a* performs the act 310 to edit the source text corresponding to the collaborative content item. As shown, the client device 108*a* displays the collaborative content item in the text display state in act 310, which includes a text zone and a graphical representation of the flowchart. As shown, based on an edit to the source text, the graphical representation of the collaborative content item is updated to reflect the changes to the source text. As discussed further below with respect to FIG. 6B, as the user inputs changes to the source text, the graphical representation updates to reflect the changes. If a change to the source text does not result in a new renderable version of the graphical representation, then the last renderable version of the graphical representation is maintained until additional changes to the source text result in a renderable graphical representation.

As further shown in FIG. 3, the collaborative rendering system 102 receives the updated source text from the client device 108*a* and performs act 312 of providing the updated source text within the online document to client device 108*b*.

Upon receiving the updated source text, the collaborative rendering system 102 can cause client device 108*b* to display an updated graphical representation of the collaborative content item. For example, the collaborative rendering system 102 can cause client device 108*b* to perform act 316 of displaying a graphical representation of the collaborative content item based on the updated source text. For example, the collaborative rendering system 102 can cause client device 108*b* to update the render display state of the collaborative content item to provide the updated graphical representation. The updating of the collaborative content item in act 316 is performed with no user input from a user associated with client device 108*b*. Accordingly, unlike existing systems, the collaborative rendering system 102 allows for the in-document editing and modifying of graphical content that is then shared with other users having access to the online document without ever having to leave the online document itself Moreover, and as also shown in FIG. 3, the client device 108*a* can switch from the text display state to the render display state to provide an updated graphical representation of the collaborative content item, as shown in act 314. In particular, based on receiving a user, the collaborative rendering system 102 can cause client device 108*b* to provide the render display state and display a graphical representation of the collaborative content item based on the updated source text. Accordingly, based on the disclosure with respect to FIG. 3, it is understood that multiple client devices can have concurrent access to a collaborative content item within an online document. The concurrent access provides for real-time collaboration on the collaborative content item, resulting in dynamically incorporating changes to a graphical representation of the collaborative content item based on changes to source text received from one or more client devices.

Figure 4:
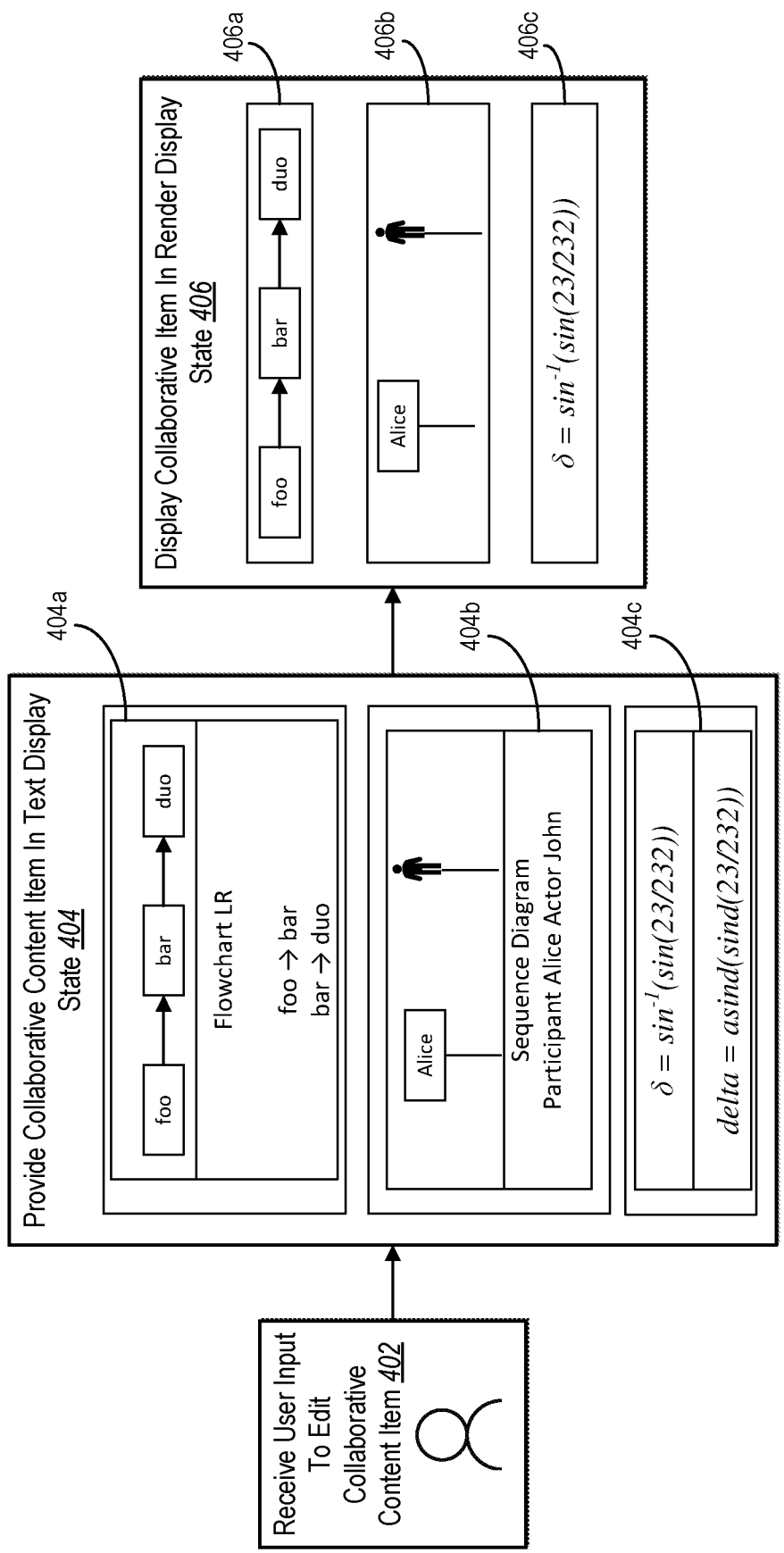
FIG. 4 illustrates an example of text display states and render display states of collaborative content items in accordance with one or more embodiments.

As mentioned, the collaborative rendering system 102 provides a collaborative content item that includes a render display state and a text display state and provides the collaborative content item based on client device interaction with these two states. In particular, the collaborative rendering system 102 can render and display a graphical representation of the source text provided while in the text display state. FIG. 4 illustrates example embodiments of the text display state and the render display state of the collaborative rendering system 102.

As illustrated in FIG. 4, the client device (e.g., or one of client devices 108*a*-108*n*) displays a collaborative content item in a text display state. In particular, the collaborative rendering system 102 can perform the act 402 to receive user input to edit the collaborative content item. Based on a user indication to edit the collaborative content item (e.g., selection of the content item), the collaborative rendering system 102 can perform act 404 to change the state of the collaborative content item to the text display state. The user selection can be via any applicable user selection method or appropriate interaction with the collaborative content item (e.g., mouse click, menu selection, voice selection).

As shown in FIG. 4, the text display state can include a text input zone and a rendering of the graphical representation of the source text. Indeed, FIG. 4 in act 404 illustrates three examples of different collaborative content items as each collaborative content item can include a variety of source text types that correspond to different graphical representation types. For example, the text display state 404*a* includes source text for a flowchart and the corresponding graphical representation of a flowchart. Further, the collaborative content item text display state 404*b* includes source text for a sequence diagram and the corresponding graphical representation of the sequence diagram. Further the collaborative content item text display state 404*c* includes source text for an equation and the corresponding graphical representation of the mathematical equation. The text display state is not limited to the graphical representations shown and can include (but is not limited to) a sequence diagram, a block diagram, a Gantt diagram, a class diagram, a Git diagram, a pie chart, an entity relationship diagram, or a User Journey diagram. As shown, based on editing the text in the text display state, the graphical representation is updated within the text display state to reflect the updated source text.

As further illustrated in FIG. 4, the collaborative rendering system 102 performs act 406 to display the graphical representation of the collaborative content item in the render display state. The collaborative rendering system 102 can perform act 406 based on receiving user input to enter the collaborative content item render display state. The collaborative rendering system 102 can also perform act 406 as the default collaborative content item state for users of the collaborative rendering system 102 in the online document. To illustrate, the render display state 406*a* includes the graphical representation of a flowchart that corresponds to the collaborative content item text display state 404*a*. Further, the render display state 406*b* includes the graphical representation of a sequence diagram that corresponds to the collaborative content item text display state 404*b*. Further, the render display state 406*c* includes the graphical representation of a mathematical equation that corresponds to the collaborative content item text display state 404*c*. Indeed, a client device can present the collaborative content item in either the render display state or the text display state.

While FIG. 4 describes an example embodiment where the collaborative rendering system receives edits of the source text to then render an updated graphical representation of the collaborative content item, other example embodiments can accept edits via the graphical representation. For example, the collaborative rendering system can receive an indication of a user interaction with the graphical representation of the collaborative content item, and based on the user interactions, the collaborative content system can update the graphical representation. For instance, in the event the collaborative content item includes a sequence diagram, the collaborative content system can receive an indication of a user interaction that modifies a connector between sequence blocks with the diagram. Based on the user interaction modifying the connector between sequence blocks, the collaborative content system can the graphical representation. This can be accomplished by the collaborative content system providing a collaborative content item in a graphical user interface editable state within which elements of the graphical representation are selectable and editable. Once the collaborative content system receives one or more modifications within the graphical user interface editable state, the system can then update the render display state across the various devices that share the collaborative content item. In one or more embodiments, the collaborative content system can update source text based on receiving user interactions that modify one or more elements of the graphical representation.

Figure 5:
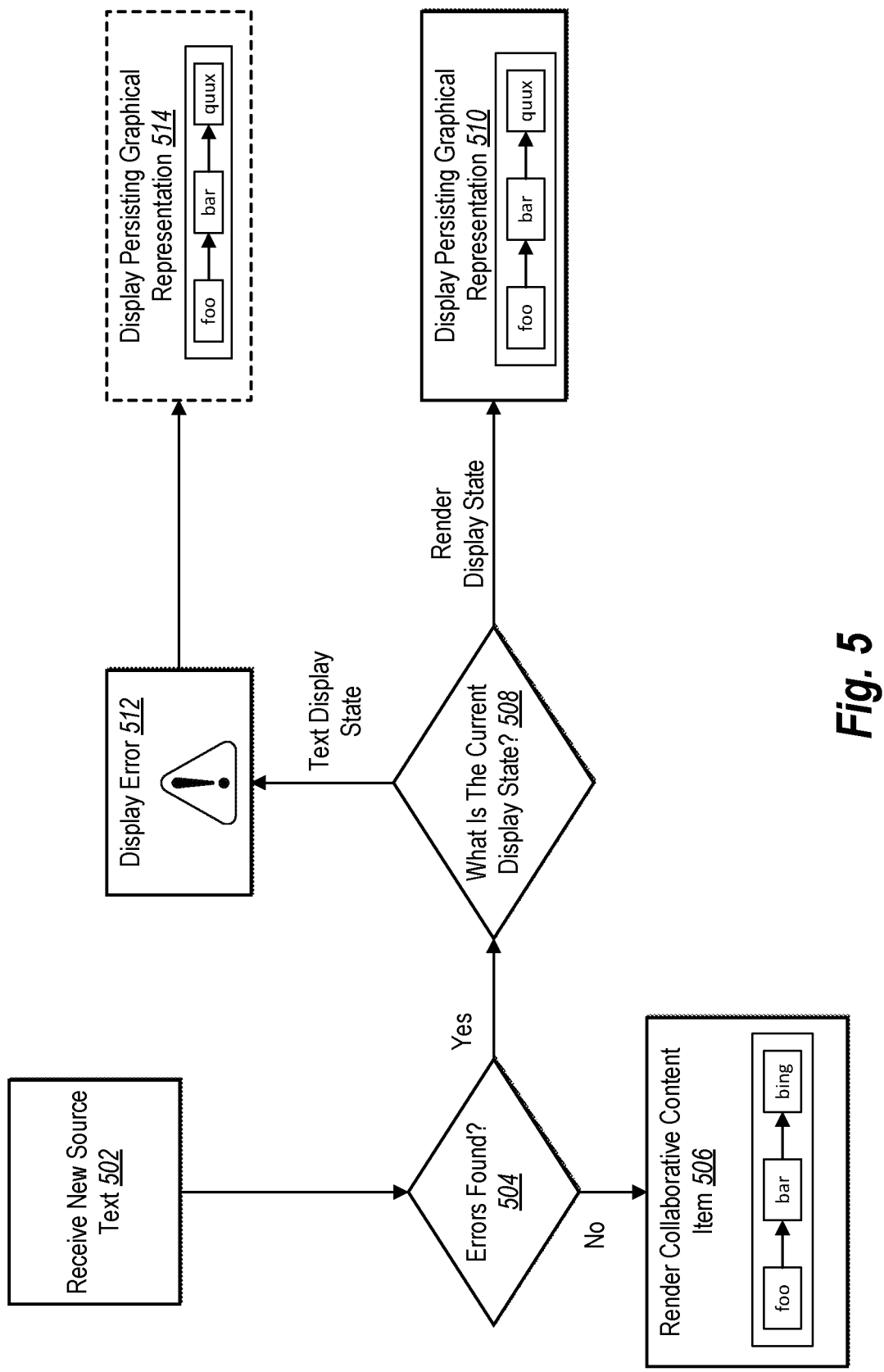
FIG. 5 illustrates an example of rendering logic for a collaborative content item in accordance with one or more embodiments.

Furthermore, the collaborative rendering system 102 can account for input errors in the source text (e.g., invalid syntax) when generating, displaying, and editing the collaborative content items. As illustrated in FIG. 5, in accordance with one or more embodiments, the collaborative rendering system 102 provides the graphical representation based on error conditions.

As illustrated in FIG. 5, the collaborative rendering system 102 performs the act 502 to receive a new source text (e.g., when within the text display state). After receiving the new source text, the collaborative rendering system 102 performs the act 504 to check for errors in the updated source text. In particular, the collaborative rendering system 102 checks the syntax of the updated source text to determine if the update changes the source text in a way that causes the source text to be unrenderable in a graphical representation. If no errors are found and the source text is renderable, the collaborative rendering system 102 performs the act 506 to render the collaborative content item. Notably, the collaborative rendering system 102 can render the collaborative content item in the text display state and/or the render display state depending on the current state of the collaborative content item on a particular client device.

As further illustrated in FIG. 5, if the collaborative rendering system 102 performs act 504 and determines that there are errors in the updated source text, the collaborative rendering system 102 performs the act 508 to determine the current state (e.g., the text display state or the render display state). If the collaborative rendering system 102 is in the render display state, the collaborative rendering system 102 performs the act 510 to display the persisting graphical representation of the collaborative content item. In particular, the collaborative rendering system 102 displays the last valid version of the graphical representation (e.g., the graphical representation before errors were introduced).

If the collaborative rendering system 102 is in the text display state, the collaborative rendering system 102 performs the act 512 to display an error. In particular, the collaborative rendering system 102 can display a syntax error within the text input zone of the text display state. Additionally, the collaborative rendering system 102 can display an indication of the error on the graphical representation within the text display state. For example, the collaborative rendering system 102 can display an indication on the graphical representation indicating the graphical representation does not correspond to the updated source text due to the error (e.g., text or color noting the outdated version). As another example, the collaborative rendering system 102 can update the graphical representation to display an indication on the graphical representation to visually show where the error affects the graphical representation (e.g., color, marching ants, text, emphasis). As further illustrated in FIG. 5, the collaborative rendering system 102 can optionally perform the act 514 to display the persisting graphical representation. In particular, the collaborative rendering system 102 can display the last valid version of the graphical representation of the collaborative content item (e.g., the graphical representation before errors).

As mentioned above, the collaborative rendering system 102 generates and provides a collaborative rendering interface for display on a client device (e.g., the client devices 108*a*-108*n*) within an online document. In particular, FIGS. 6A-6B illustrate the collaborative rendering system 102 providing an online document interface 602*a* displayed via a computing device 600 in accordance with one or more embodiments.

Figure 6A:
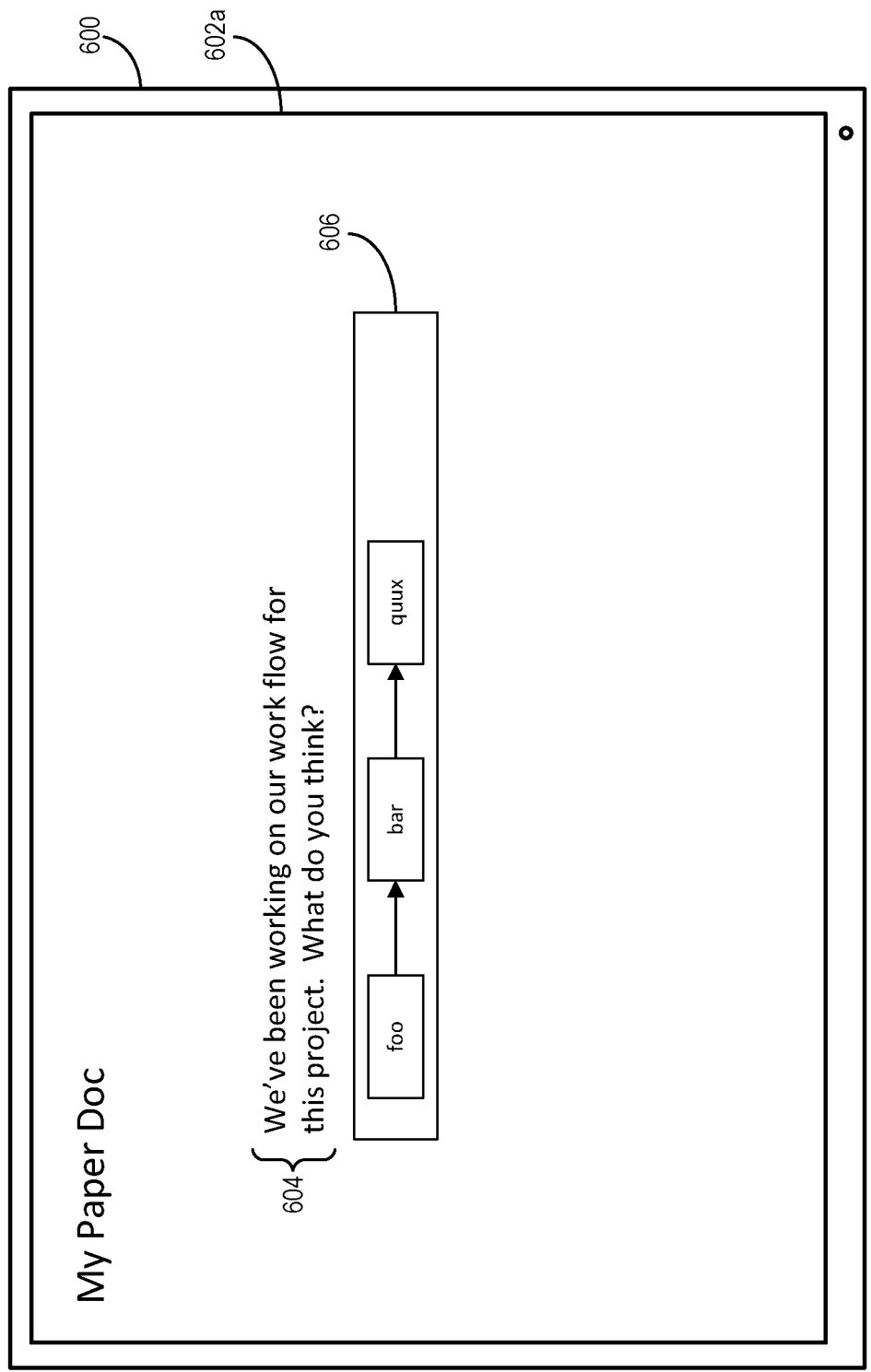
FIG. 6A illustrates an example graphical user interface of an online document for providing a collaborative content item in a render display state in accordance with one or more embodiments.

As shown on FIG. 6A, the collaborative rendering system 102 displays the graphical representation 606 of the collaborative content item within the online document interface 602*a* in the render display state. As further shown in FIG. 6A, the online document interface 602*a* can include additional content items, such as text content 604. The collaborative rendering system 102 can include additional content item types, such as images, videos, audio, text, tables, checklists, timelines, and other content item types. In this way, users can generate an online document that includes a collaborative content item alongside other meaningful and related content within the same online document.

Figure 6B:
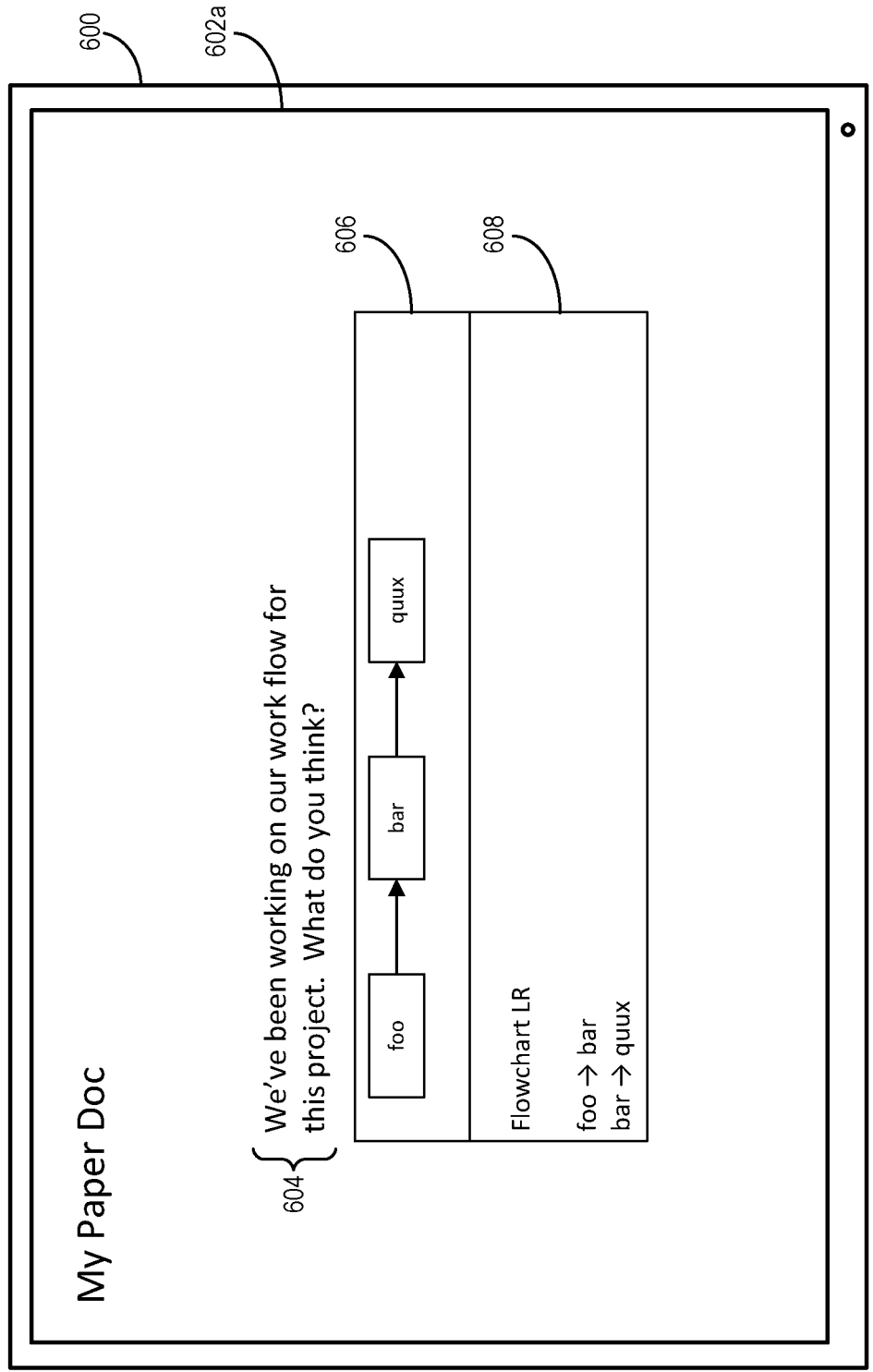
FIG. 6B illustrates an example graphical user interface of an online document for providing a collaborative content item in a text display state in accordance with one or more embodiments.

As further shown on FIG. 6B, based on detecting a user interacting with the graphical representation 606 of the collaborative content item shown in the render display state in FIG. 6A, the collaborative rendering system 102 can change to provide the collaborative content item in a text display state. In particular, FIG. 6B displays the collaborative content item in the text display state. In some embodiments, and as shown in FIG. 6, the text display state includes the graphical representation 606 positioned above a text zone 608 within which source text is input. Accordingly, the collaborative rendering system 102 can display the graphical representation 606 of the collaborative content item in real-time as the source text is modified within the text display state. Alternatively, in one or more embodiments, the collaborative rendering system 102 can delay updating the graphical representation to account for user preference, client device settings, system settings, system performance, or other concerns.

As shown in FIGS. 6A-6B, the online document includes other communication and collaboration with other client devices. In particular, the collaborative rendering system 102 integrates the collaborative content item within the online document interface 602a and provides an interface for real-time interaction with the collaborative content item (e.g., changes to the graphical representation of the collaborative content item by interacting with the collaborative content item) to multiple client devices concurrently. Indeed, the collaborative rendering system provides an interface for live collaboration on graphical content that is integrated with other collaborative content in the online document interface 602a.

Figure 7:
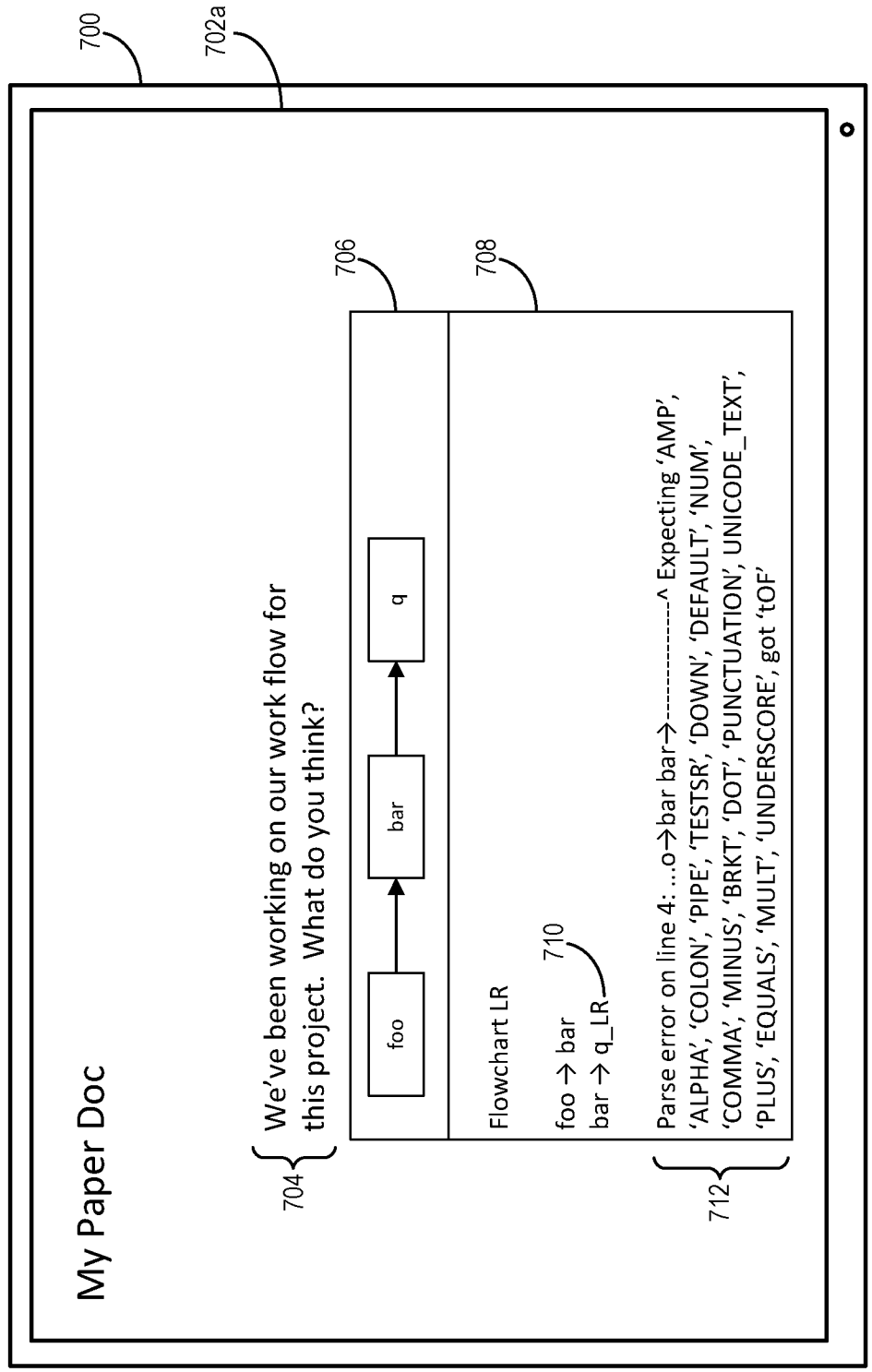
FIG. 7 illustrates an example graphical user interface of an online document for providing a collaborative content item in a text display state in accordance with one or more embodiments.

As mentioned above with respect to FIG. 5, when the collaborative rendering system 102 determines that the text input causes the collaborative content item to be unrenderable, the collaborative rendering system 102 provides errors within the text display state. In particular, FIG. 7 illustrates the collaborative rendering system 102 providing a collaborative content item in the text display state within the online document interface 702a displayed via a computing device 700 in accordance with one or more embodiments. As shown, the online document interface 702a includes text content 704 displayed in combination with the collaborative content item.

As shown in FIG. 7, the collaborative rendering system 102 determines that the source text input via the text zone 708 contains a syntax error 710 (e.g., error in the source text) that causes the collaborative content item to be unrenderable. As shown, the collaborative rendering system 102 provides an error display 712 within the text zone 708. The error display 712 can include a textual identification of the syntax error, an error explanation, and/or error codes associated with the error. As shown, the collaborative rendering system 102 may persist in displaying the graphical representation 706 of the most recent valid version of the flowchart before the error occurred. In some embodiments, when there is an error in the source text, the collaborative rendering system 102 may remove the display of the graphical representation. In some embodiments, when there is an error in the source text, the collaborative rendering system 102 may present a graphical indication of the error with respect to the graphical representation 706 (e.g., through emphasis, color, flashing, missing sections, dotted lines).

As mentioned above, when the collaborative rendering system 102 provides for the collaborative editing of collaborative content items within an online document. In particular, FIGS. 8A-8B illustrate the collaborative rendering system 102 and online document interfaces 802a and 806a identifying user interaction with the collaborative content item displayed via computing device A 802 and client device B 806, in accordance with one or more embodiments.

Figure 8A:
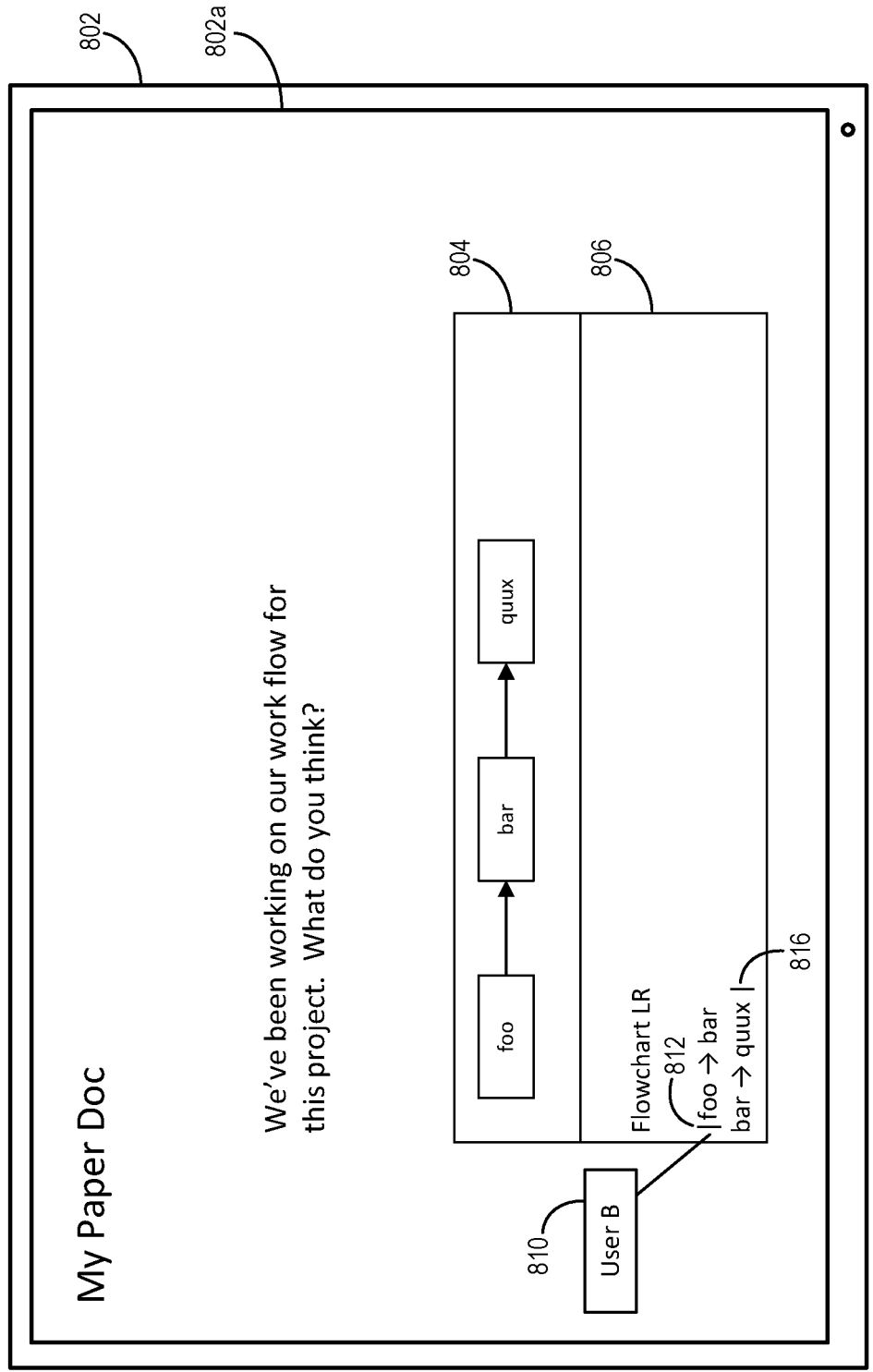
FIG. 8A-8B illustrate an example graphical user interface of an online document showing multiple users editing a collaborative content item in accordance with one or more embodiments.

As shown in FIG. 8A, the collaborative rendering system 102 provides a user ID indication 810 within the online document interface 802a on the client device A (e.g., the client device for User A) of the simultaneous edit of a collaborative content item by client device B (e.g., edit by User B). In particular, as shown in FIG. 8A, the user ID indication 810 can include a name of a user. In alternative embodiments, the user ID indication 810 can include an image, graphic, or other identifying indication of a user. Moreover, as also shown in FIG. 8A, in addition to the user ID indication 810, the collaborative rendering system 102 can provide a cursor position 812 of user B within the text zone 806 of the collaborative content item. This allows user A to view a live location of the source text that user B may be editing. In addition, the collaborative rendering system 102 can provide the cursor position 816 of user A. Accordingly, FIG. 8A illustrates how the collaborative rendering system 102 can allow for multiple users to collaborate on a collaborative content item while both users are accessing the collaborative content item in the text display state.

Figure 8B:
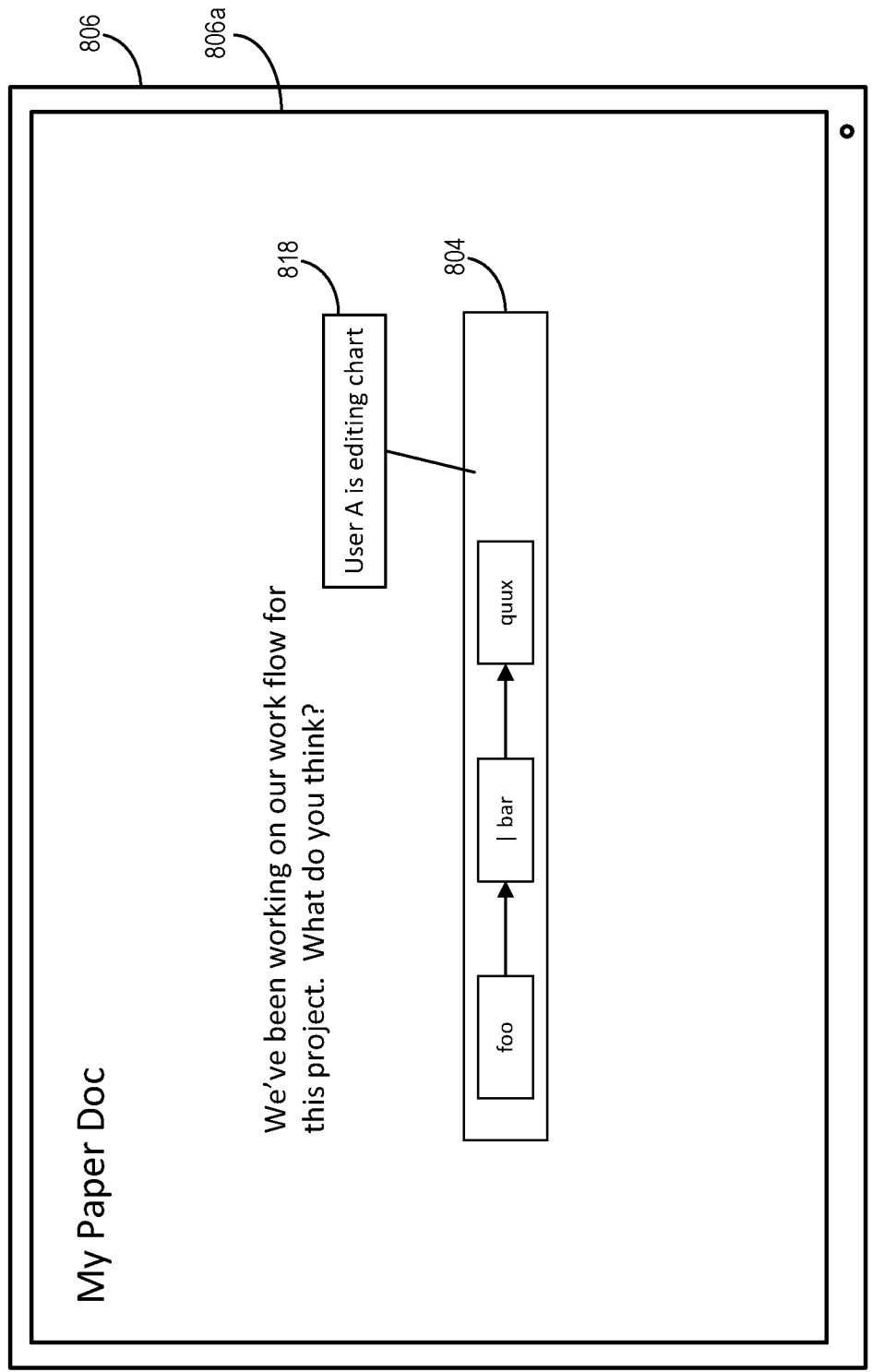

Similarly, as shown in FIG. 8B, the collaborative rendering system 102 can provide an indication of user presence to another client device while the collaborative content item is in the render display state. For example, FIG. 8B illustrates a user ID indication 818 within online content interface 806a on the client device B (e.g., the client device for User B) of the simultaneous edit of the collaborative content item by client device A (e.g., edit by User A). Indeed, the collaborative rendering system 102 can display a user ID indication 818 of user A associated with client device A editing the source text of the collaborative content item even when user B is viewing the collaborative content item in the render display state 804. Thus, regardless of what state (i.e., text display state or render display state) the collaborative content item is shown, the collaborative rendering system 102 can provide indications of other users accessing and editing the collaborative content item. As another example, the collaborative rendering system 102 can provide an indication that other client devices are editing the collaborative content item by providing an indication on the graphical representation (e.g., highlighting, borders, dashed lines). As another example, the collaborative rendering system 102 can provide an indication that other client devices are editing the collaborative content item by providing an associated indication within the online document in conjunction with the collaborative content item.

Figure 9:
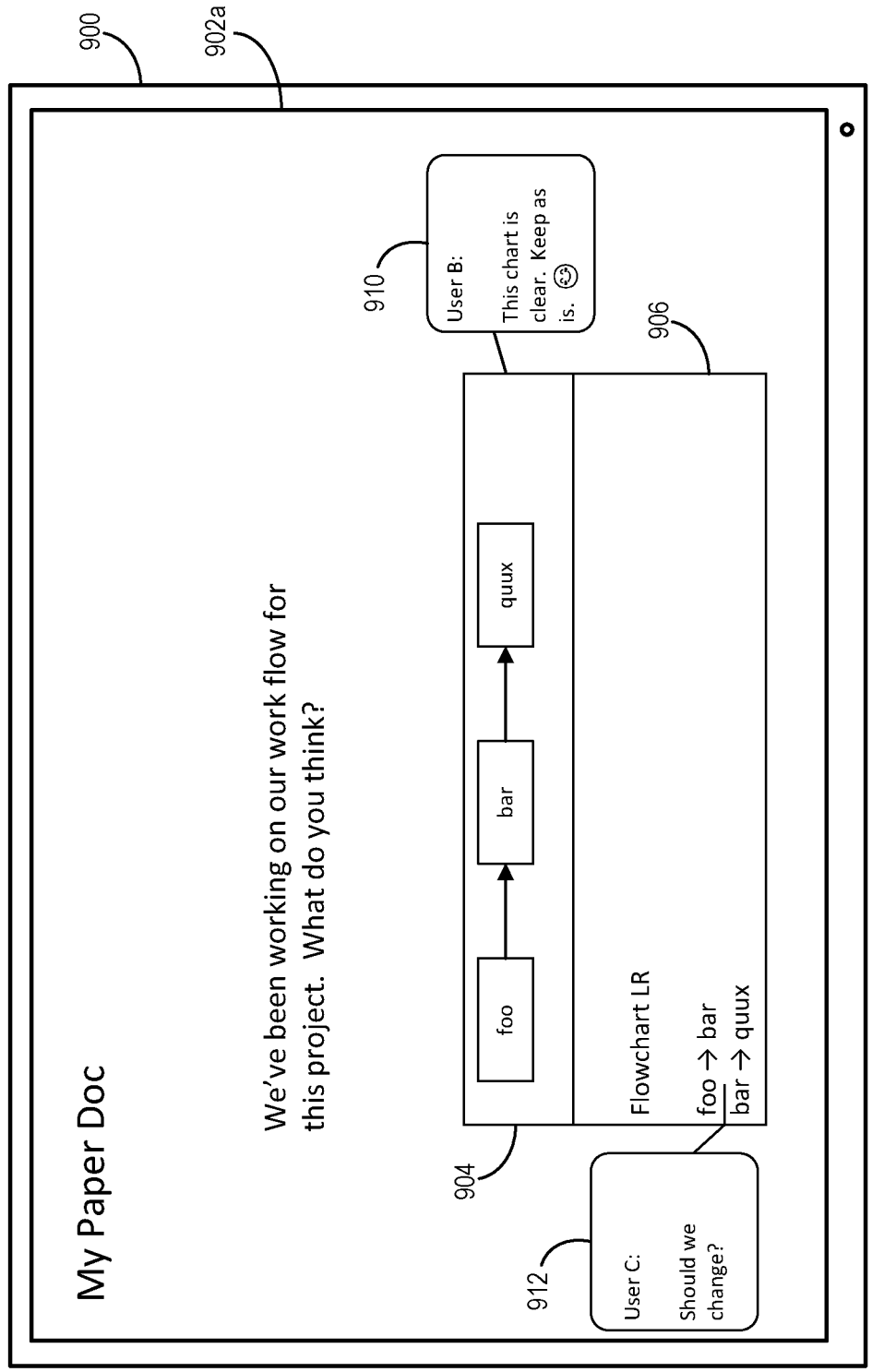
FIG. 9 illustrates an example an example graphical user interface of an online document providing various user comments with respect to a collaborative content item in accordance with one or more embodiments.

In addition to receiving source text updates corresponding to the graphical representation of the collaborative content item, the collaborative rendering system 102 can provide a method for client devices to provide collaborative comments with respect to the collaborative content item. As illustrated in FIG. 9, the online document interface 902a displayed via a computing device 900 can include an indication of a user interaction associated with the collaborative content item. For example, the collaborative rendering system 102 can provide an indication that a user reacted to the collaborative content item and associate that reaction to the collaborative content item within the online document. In particular, as shown in FIG. 9, the collaborative rendering system 102 can include the user comment 910 "This chart is clear. Keep as is" and associate the user comment 910 with the graphical representation 904 of the collaborative content item. Indeed, the collaborative rendering system 102 can provide an indication of user feedback, suggestions, reactions, comments, stickers, emojis, or other user comments relative to the graphical representation of the collaborative content item and associate these indications with the collaborative content item.

Notably, the collaborative rendering system 102 can associate the user reaction to the collaborative content item in the render display state (as shown in with comment 910) and/or with the collaborative content item in the text display state, as shown with comment 912. For example, as shown in FIG. 9, a user C provided a comment with respect to a portion of source text within the text zone 906. Accordingly, the collaborative rendering system 102 can associate comments with specific source text allowing for users to collaborate with a high degree of granularity with respect to the source text. A given collaborative content item can have comments that correspond to the graphical representation, the source text, or both. In addition, the collaborative rendering system 102 can provide notification of comments related to the source text when the collaborative content item is displayed in the render display state, e.g., such as a star or other visual indicator that indicates a user can switch to the text display state to access the comment.

Figure 10B:
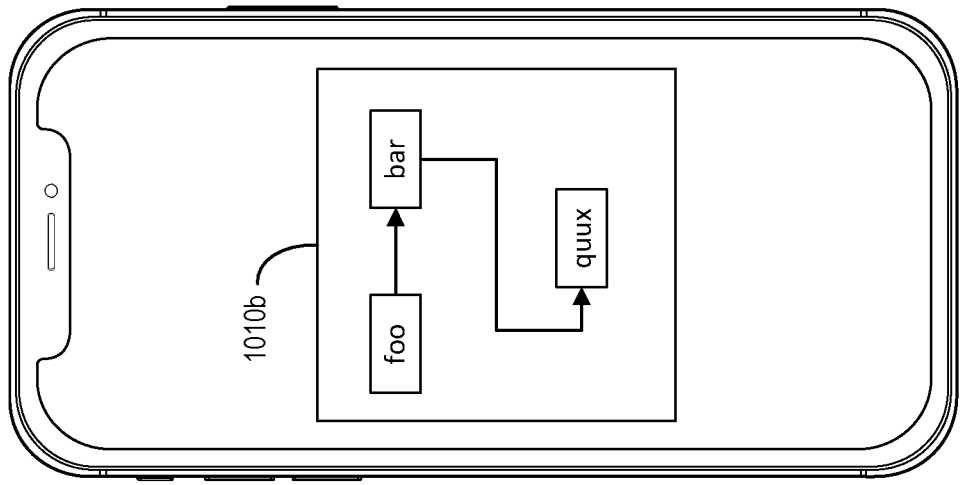
FIGS. 10A-10B illustrate an example of providing a graphical representation of a collaborative content item on different client devices in accordance with one or more embodiments.
Figure 10A:
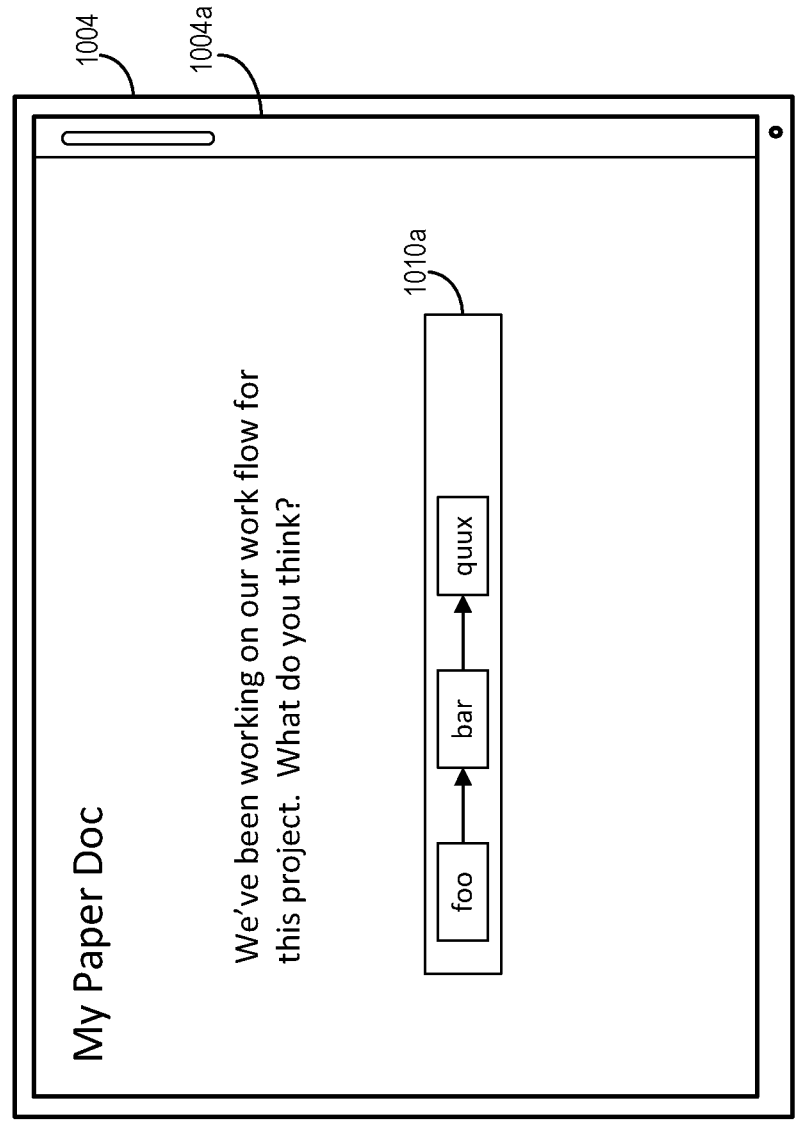

FIGS. 10A-10B illustrate the collaborative rendering system 102 displaying different versions or formats of graphical representations of a collaborative content item based on client device attributes. As shown on FIG. 10A, the collaborative rendering system 102 displays a graphical representation of the collaborative content item within the online document in the online document interface 1004a. As further shown in FIG. 10A, the collaborative rendering system 102 displays a sequence diagram 1010a in the render display state based on source text, as described above. The sequence diagram 1010a is rendered on the client device 1004 based on attributes of client device 1004.

Relatedly, FIG. 10B illustrates the collaborative rendering system 102 providing a different format of the sequence diagram 1010b based on attributes of the mobile device. Notably, the sequence diagram 1010b is not identical to the sequence diagram 1010a although both sequence diagrams were rendered based on the source text. Indeed, the collaborative rendering system 102 can render the collaborative content item based on client device attributes, such as client device type, screen size, screen resolution, or user preferences associated with the client device. In particular, because the mobile device of FIG. 10B has a smaller screen, the collaborative rendering system 102 reformats the graphical representation of the collaborative content item to accommodate for the smaller screen size compared to the larger screen of client device 1004 shown in FIG. 10A.

The components of the collaborative rendering system 102 can include software, hardware, or both. For example, the components of the collaborative rendering system 102 can include one or more instructions stored on a computer-readable storage medium and executable by processors of one or more computing devices. When executed by one or more processors, the computer-executable instructions of the collaborative rendering system 102 can cause a computing device to perform the methods described herein. Alternatively, the components of the collaborative rendering system 102 can comprise hardware, such as a special purpose processing device to perform a certain function or group of functions. Additionally, or alternatively, the components of the collaborative rendering system 102 can include a combination of computer-executable instructions and hardware.

Furthermore, the components of the collaborative rendering system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the collaborative rendering system 102 may be implemented as part of a stand-alone application on a personal computing device or a mobile device.

Figure 11:
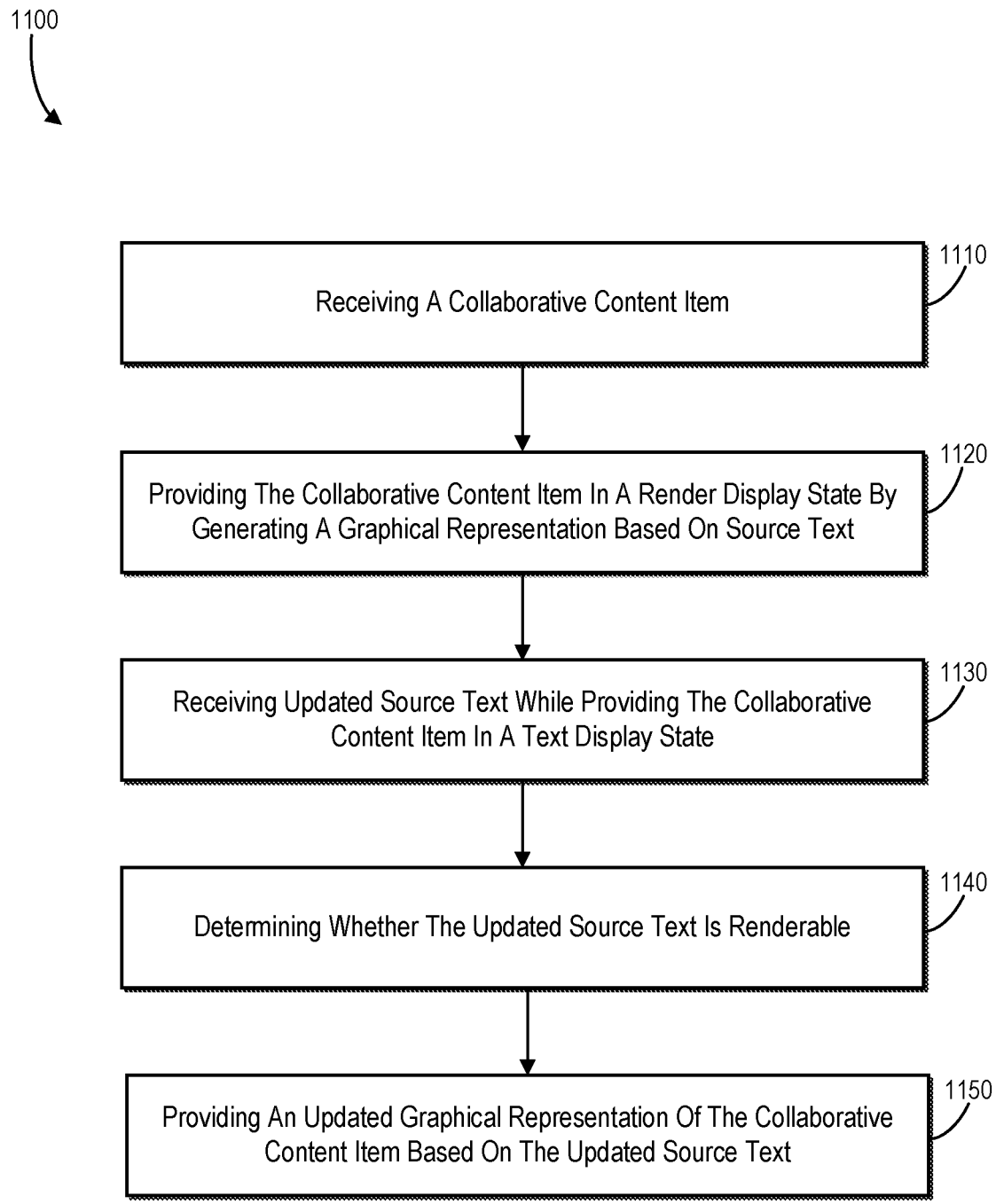
FIG. 11 illustrates a flowchart of a series of acts for generating and editing a collaborative content item in accordance with one or more embodiments.

FIGS. 1-10, the corresponding text, and the examples provide a number of different systems and methods for dynamically generating, providing, and editing collaborative graphical content in an online document. In addition to the foregoing, implementations can also be described in terms of flowcharts comprising acts steps in a method for accomplishing a particular result. For example, FIG. 11 illustrates an example series of acts for dynamically generating, providing, and editing collaborative graphical content in an online document. While FIG. 11 illustrates acts according to certain implementations, alternative implementations may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further implementations, a system can perform the acts of FIG. 11.

As illustrated in FIG. 11, the series of acts 1100 may include an act 1110 of receiving a collaborative content item. In particular, the act 1110 can involve receiving, by a first client device, a collaborative content item comprising a text display state and a render display state, wherein the render display state of the collaborative content item comprises a graphical representation based on source text entered via the text display state. Moreover, acts 1100 can include providing the collaborative content item in the render display state by rendering the source text to provide the graphical representation based on determining one or more attributes of the first client device, the one or more attributes comprising at least one of screen size, device type, or user accessibility, and rendering the source text based on the one or more attributes of the first client device to customize a display format of the graphical representation of the collaborative content item for the first client device.

In addition, the series of acts 1100 includes an act 1120 of providing the collaborative content item in a render display state by generating a graphical representation of the collaborative content item based on source text. For example, act 1120 can include providing, at the first client device, the collaborative content item in the render display state by rendering the source text to provide the graphical representation of the collaborative content item.

Further, the series of acts 1100 includes an act 1130 of receiving updated source text while providing the collaborative content item in a text display state. For instance, act 1130 can include receiving, by the first client device, updated source text for the collaborative content item, the updated source text based on an edit initiated by a second client device. In some examples, the text display state of the collaborative content item comprises a display of the source text and the graphical representation based on rendering the source text. Moreover, in other examples, the acts 1100 can include providing an error notification corresponding to the collaborative content item based on determining that the updated source text is unrenderable.

Moreover, the series of acts 1100 includes an act 1140 of determining whether the updated source text is renderable and performing act 1150 of providing an updated graphical representation of the collaborative content item based on the updated source text. Acts 1140 and 1150 can include, for example, determining, by the first client device, whether the updated source text is renderable. In addition, based on a determination that the updated source text is renderable, providing an updated graphical representation of the collaborative content item based on the updated source text. In contrast, based on a determination that the updated source text is unrenderable, persisting the graphical representation of the collaborative content item based on the source text.

In some embodiments, the series of acts 1100 includes additional acts receiving, at the first client device, a user interaction corresponding to the graphical representation of the collaborative content item, based on the user interaction, providing the collaborative content item in the text display state, wherein the text display state comprises a display of the updated source text, modifying the updated source text based on receiving an additional edit to the updated source text via the text display state, and rendering, at the first client device, the modified source text to provide a modified graphical representation of the collaborative content item.

In some embodiments, the series of acts 1100 includes additional acts of further comprising providing the collaborative content item within an online document hosted by a content management system, the online document being simultaneously accessible by the first client device and the second client device. Moreover, acts 1100 can include providing, on the first client device, a visual indication that a second client device is interacting with the collaborative content item, the visual indication comprising a text cursor when the collaborative content item is in the text display state or a user ID indication when the collaborative content item is in the render display state.

In some embodiments, the series of acts 1100 includes receiving, via the first client device, a comment with respect to the collaborative content item in the render display state, associating the comment with the graphical representation of the collaborative content item, and providing the comment along with the graphical representation when the collaborative content item is in the render display state.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission medium can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source text. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
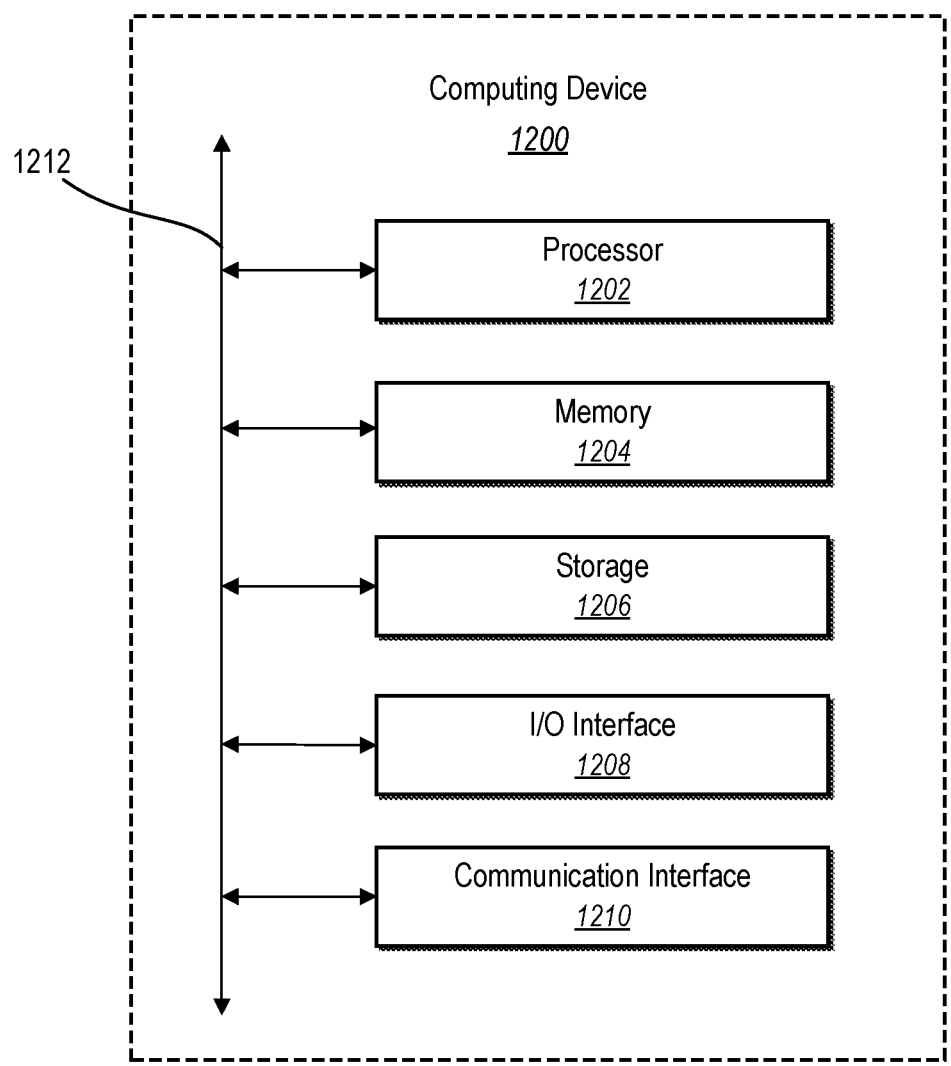
FIG. 12 illustrates a block diagram of an exemplary computing device in accordance with one or more embodiments.

FIG. 12 illustrates a block diagram of exemplary computing device 1200 (e.g., the server(s) 104 and/or the client devices 108a-108n) that may be configured to perform one or more of the processes described above. One will appreciate that server(s) 104 and/or the client devices 108a-108n may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other implementations. Furthermore, in certain implementations, computing device 1200 can include fewer components than those shown in FIG. 12. Components of computing device 1200 shown in FIG. 12 will now be described in additional detail.

In particular implementations, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage device 1206 and decode and execute them. In particular implementations, processor 1202 may include one or more internal caches for data, instructions, or addresses. As an example, and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1204 may be internal or distributed memory.

Storage device 1206 includes storage for storing data or instructions. As an example, and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular implementations, storage device 1206 is non-volatile, solid-state memory. In other implementations, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these. I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
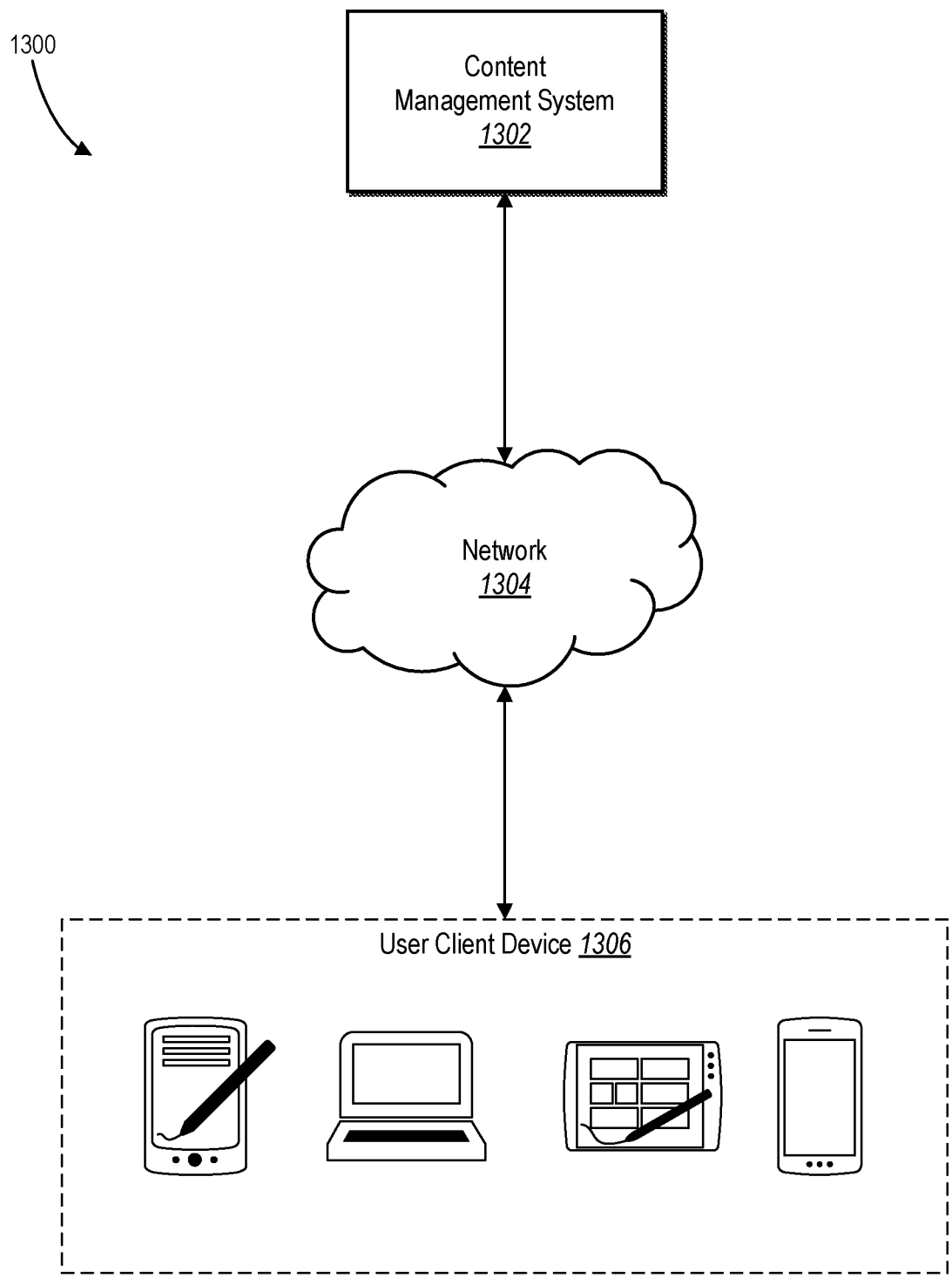
FIG. 13 illustrates an example environment of a networking system employing the collaborative rendering system in accordance with one or more embodiments.

FIG. 13 is a schematic diagram illustrating environment 1300 within which one or more implementations of the collaborative rendering system 102 can be implemented. For example, the collaborative rendering system 102 may be part of a content management system 1302 (e.g., the content management system 106). Content management system 1302 may generate, store, manage, receive, and send digital content (such as digital content items). For example, content management system 1302 may send and receive digital content to and from client devices 1306 by way of network 1304. In particular, content management system 1302 can store and manage a collection of digital content. Content management system 1302 can manage the sharing of digital content between computing devices associated with a plurality of users. For instance, content management system 1302 can facilitate a user sharing a digital content with another user of content management system 1302.

In particular, content management system 1302 can manage synchronizing digital content across multiple client devices 1306 associated with one or more users. For example, a user may edit digital content using client device 1306. The content management system 1302 can cause client device 1306 to send the edited digital content to content management system 1302. Content management system 1302 then synchronizes the edited digital content on one or more additional computing devices.

In addition to synchronizing digital content across multiple devices, one or more implementations of content management system 1302 can provide an efficient storage option for users that have large collections of digital content. For example, content management system 1302 can store a collection of digital content on content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from content management system 1302. In particular, upon a user selecting a reduced-sized version of digital content, client device 1306 sends a request to content management system 1302 requesting the digital content associated with the reduced-sized version of the digital content. Content management system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., DROPBOX PAPER for iPhone or iPad, DROPBOX PAPER for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access content management system 1302.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   providing, to a first client device, a collaborative content item comprising:
      a text display state for inputting source text to generate a graphical representation; and
      a render display state that provides a rendering of the graphical representation;
   providing, for display on the first client device, the collaborative content item in the render display state by rendering the source text to provide the graphical representation;
   determining that a second client device is actively modifying the source text of the collaborative content item; and
   based on determining that the second client device is actively modifying the source text of the collaborative content item, providing, for display on the first client device, a visual indication in association with the rendering of the graphical representation in the render display state to indicate that the second client device is actively modifying the source text of the collaborative content item.

2. The computer-implemented method of claim 1, wherein the render display state of the collaborative content item comprises the rendering of the graphical representation while refraining from displaying the source text.

3. The computer-implemented method of claim 1, further comprising providing the collaborative content item within an online document that is simultaneously accessible by the first client device and the second client device.

4. The computer-implemented method of claim 1, wherein the visual indication provided in association with the rendering of the graphical representation comprises a user identification associated with the second client device.

5. The computer-implemented method of claim 1, further comprising:
   receiving, from the second client device, updated source text based on the second client device modifying the source text; and
   based on determining whether the updated source text is renderable:
      updating, on the first client device, the graphical representation for the collaborative content item in the render display state based on determining the updated source text is renderable; or
      continuing to provide, on the first client device, the graphical representation for the collaborative content item based on the source text based on determining the updated source text is unrenderable.

6. The computer-implemented method of claim 1, further comprising:
   receiving, from the second client device, a comment associated with the graphical representation of the collaborative content item in the render display state; and
   providing, for display on the first client device, the comment in association with the graphical representation of the collaborative content item in the render display state.

7. The computer-implemented method of claim 1, further comprising:
   receiving, from the second client device, a comment associated with the source text of the collaborative content item in the text display state; and
   refraining from providing, on the first client device, the comment associated with the source text while providing the graphical representation of the collaborative content item in the render display state.

8. The computer-implemented method of claim 7, further comprising:
   receiving, from the first client device, an indication of a user interaction to switch the display of the collaborative content item from the render display state to the text display state on the first client device; and
   providing, for display on the first client device, the collaborative content item in the text display state along with the comment.

9. A system comprising:
   at least one processor; and
   a non-transitory computer readable medium comprising instructions that, when executed by the at least one processor, cause the system to:
      provide, to a first client device, a collaborative content item comprising:
         a text display state for inputting source text to generate a graphical representation; and
         a render display state that provides a rendering of the graphical representation;
      provide, for display on the first client device, the collaborative content item in the render display state by rendering the source text to provide the graphical representation; and
      based on determining that a second client device is actively modifying the source text of the collaborative content item, provide, for display on the first client device, a visual indication in association with the rendering of the graphical representation in the render display state to indicate that the second client device is actively modifying the source text of the collaborative content item.

10. The system of claim 9, further comprising instructions that, when executed by the at least one processor, cause the system to provide the collaborative content item within an online document that is simultaneously accessible by the first client device and the second client device.

11. The system of claim 9, further comprising instructions that, when executed by the at least one processor, cause the system to refrain from providing for display, on the first client device, the source text while providing the collaborative content item in the render display state.

12. The system of claim 9, further comprising instructions that, when executed by the at least one processor, cause the system to:
- determine whether updated source text received from the second client device is renderable; and
- continue to provide, on the first client device, the graphical representation for the collaborative content item based on the source text in response to determining the updated source text is unrenderable.

13. The system of claim 9, further comprising instructions that, when executed by the at least one processor, cause the system to:
- receive, from the second client device, a comment associated with the graphical representation of the collaborative content item in the render display state; and
- provide, for display on the first client device, the comment in association with the graphical representation of the collaborative content item in the render display state.

14. The system of claim 9, further comprising instructions that, when executed by the at least one processor, cause the system to:
- determine updated source text received from the second client device is unrenderable; and
- provide, for display on the first client device, the graphical representation in the render display state based on the source text and an error notification associated with the graphical representation.

15. The system of claim 9, wherein the visual indication provided in association with the rendering of the graphical representation comprises a user identification associated with the second client device.

16. A non-transitory computer readable medium comprising instructions that, when executed by at least one processor, cause a computing device to:
- provide, to a first client device, a collaborative content item comprising a text display state for inputting source text to generate a graphical representation and a render display state that provides a rendering of the graphical representation;
- provide, for display on the first client device, the collaborative content item in the render display state by rendering the source text to provide the graphical representation; and
- based on determining that a second client device is actively modifying the source text of the collaborative content item, provide, for display on the first client device, a visual indication in association with the rendering of the graphical representation in the render display state to indicate that the second client device is actively modifying the source text of the collaborative content item.

17. The non-transitory computer readable medium of claim 16, further comprising instructions that, when executed by the at least one processor, cause the computing device to provide the collaborative content item within an online document that is simultaneously accessible by the first client device and the second client device.

18. The non-transitory computer readable medium of claim 16, further comprising instructions that, when executed by the at least one processor, cause the computing device to:
- determine whether updated source text received from the second client device is renderable; and
- continue to provide, on the first client device, the graphical representation for the collaborative content item based on the source text in response to determining the updated source text is unrenderable.

19. The non-transitory computer readable medium of claim 16, further comprising instructions that, when executed by the at least one processor, cause the computing device to:
- receive, from the second client device, a comment associated with the graphical representation of the collaborative content item in the render display state; and
- provide, for display on the first client device, the comment in association with the graphical representation of the collaborative content item in the render display state.

20. The non-transitory computer readable medium of claim 16, further comprising instructions that, when executed by the at least one processor, cause the computing device to:
- determine updated source text received from the second client device is unrenderable; and
- provide, for display on the first client device, the graphical representation in the render display state based on the source text and an error notification associated with the graphical representation.

* * * * *